United States Patent
Georg et al.

(10) Patent No.: US 12,008,208 B2
(45) Date of Patent: Jun. 11, 2024

(54) MERGING COMPUTER-GENERATED OBJECTS

(71) Applicant: Apple Inc., Cupertino, CA (US)

(72) Inventors: Nicolai Georg, San Francisco, CA (US); Aaron M. Burns, Sunnyvale, CA (US); Adam G. Poulos, Saratoga, CA (US); Arun Rakesh Yoganandan, San Francisco, CA (US); Benjamin Hylak, San Francisco, CA (US); Benjamin R. Blachnitzky, San Francisco, CA (US)

(*) Notice: Subject to any disclaimer, the term of this patent is extended or adjusted under 35 U.S.C. 154(b) by 13 days.

(21) Appl. No.: 18/121,673

(22) Filed: Mar. 15, 2023

(65) Prior Publication Data

US 2023/0325047 A1     Oct. 12, 2023

Related U.S. Application Data

(63) Continuation of application No. PCT/US2021/047878, filed on Aug. 27, 2021.
(Continued)

(51) Int. Cl.
*G06F 17/00* (2019.01)
*G06F 3/01* (2006.01)
(Continued)

(52) U.S. Cl.
CPC .......... *G06F 3/04815* (2013.01); *G06F 3/014* (2013.01); *G06F 3/0486* (2013.01);
(Continued)

(58) Field of Classification Search
CPC .... G06F 3/04815; G06F 3/014; G06F 3/0486; G06F 2203/0331; G06F 2203/04802;
(Continued)

(56) References Cited

U.S. PATENT DOCUMENTS 8,656,314 B2   2/2014   Locket et al.
9,477,312 B2   10/2016  Hoang et al.
(Continued)

FOREIGN PATENT DOCUMENTS

EP    3518089 A1 *  7/2019   ......... G06F 3/04817
EP    3518089 A1    7/2019
(Continued)

OTHER PUBLICATIONS

PCT International Search Report and Written Opinion dated Dec. 21, 2021, PCT International Application No. PCT/US2021/047878, pp. 1-12.

*Primary Examiner* — Laurie A Ries
(74) *Attorney, Agent, or Firm* — Fernando & Partners, LLP

(57) ABSTRACT

A method includes displaying a plurality of computer-generated objects, including a first computer-generated object at a first position within an environment and a second computer-generated object at a second position within the environment. The first computer-generated object corresponds to a first user interface element that includes a first set of controls for modifying a content item. The method includes, while displaying the plurality of computer-generated objects, obtaining extremity tracking data. The method includes moving the first computer-generated object from the first position to a third position within the environment based on the extremity tracking data. The method includes, in accordance with a determination that the third position satisfies a proximity threshold with respect to the second position, merging the first computer-generated object with the second computer-generated object in order to generate a third computer-generated object for modifying the content item. The method includes displaying the third computer-generated object.

20 Claims, 24 Drawing Sheets

Related U.S. Application Data

(60) Provisional application No. 63/079,222, filed on Sep. 16, 2020.

(51) Int. Cl.
  *G06F 3/04815* (2022.01)
  *G06F 3/0486* (2013.01)

(52) U.S. Cl.
  CPC ............... *G06F 2203/0331* (2013.01); *G06F 2203/04802* (2013.01)

(58) Field of Classification Search
  CPC .... G06F 3/017; G06F 3/04842; G06F 3/0481; G06F 1/1694; G06F 1/163
  See application file for complete search history.

(56) References Cited

U.S. PATENT DOCUMENTS

| | | | |
|---|---|---|---|
| 10,168,856 B2 * | 1/2019 | Andersen | G06F 3/04845 |
| 2012/0249741 A1 | 10/2012 | Maciocci et al. | |
| 2013/0283214 A1 | 10/2013 | Kim et al. | |
| 2015/0277700 A1 * | 10/2015 | He | G06F 3/04842 715/852 |
| 2016/0009300 A1 * | 1/2016 | Cooper | B61L 3/121 701/20 |
| 2017/0278309 A1 * | 9/2017 | Hurter | G06T 15/08 |
| 2018/0005437 A1 * | 1/2018 | Anderson | G06T 1/20 |
| 2018/0246577 A1 * | 8/2018 | Bostick | G06F 3/0346 |
| 2018/0335937 A1 * | 11/2018 | Hauenstein | G06F 3/04883 |
| 2019/0073111 A1 * | 3/2019 | Luchner | G06F 3/04886 |
| 2019/0333278 A1 * | 10/2019 | Palangie | G06T 19/003 |
| 2019/0369741 A1 * | 12/2019 | Chen | G06V 40/28 |
| 2020/0082632 A1 * | 3/2020 | Burns | G06T 19/006 |
| 2020/0098188 A1 * | 3/2020 | Bar-Zeev | G06F 3/011 |
| 2020/0387290 A1 * | 12/2020 | Issayeva | A61B 34/20 |
| 2021/0055802 A1 * | 2/2021 | Kim | G06F 3/0304 |
| 2022/0253150 A1 * | 8/2022 | Gribetz | G06F 3/04842 |

FOREIGN PATENT DOCUMENTS

| | | | | |
|---|---|---|---|---|
| EP | 3650984 A1 | 5/2020 | | |
| WO | 2019229698 A1 | 12/2019 | | |
| WO | WO-2019229698 A1 * | 12/2019 | | G06F 3/011 |

* cited by examiner

MERGING COMPUTER-GENERATED OBJECTS

CROSS-REFERENCE TO RELATED APPLICATIONS

This application is a continuation of Intl. Patent App. No. PCT/US2021/047878, filed on Aug. 27, 2021, which claims priority to U.S. Provisional Patent App. No. 63/079,222, filed on Sep. 16, 2020, which are hereby incorporated by reference in their entireties.

TECHNICAL FIELD

The present disclosure relates to displaying computer-generated objects, and in particular, manipulating the computer-generated objects.

BACKGROUND

An electronic device may enable manipulation of a displayed computer-generated object based on an input from an integrated input system, such as an extremity tracking input or an eye tracking input. Utilizing an input from an integrated input system in order to manipulate a computer-generated object introduces a number of issues. For example, when a physical object occludes a portion of an extremity of a user, the reliability of the extremity tracking input is correspondingly reduced. As another example, a computer-generated object that has a relatively high depth with respect to the display, such as a computer-generated object located in a scene background, may be difficult for a user to manipulate, thereby introducing tracking inaccuracies.

SUMMARY

In accordance with some implementations, a method is performed at an electronic device with one or more processors, a non-transitory memory, a display, and an extremity tracker. The method includes displaying, on the display, a plurality of computer-generated objects within an environment. The plurality of computer-generated objects includes a first computer-generated object at a first position within the environment and a second computer-generated object at a second position within the environment. The first computer-generated object corresponds to a first user interface element that includes a first set of controls for modifying a content item. The method includes, while displaying the plurality of computer-generated objects, obtaining extremity tracking data from the extremity tracker. The method includes moving the first computer-generated object from the first position to a third position within the environment based on the extremity tracking data. The method includes, in response to moving the first computer-generated object to the third position, determining whether the third position satisfies a proximity threshold with respect to the second position. The method includes, in accordance with a determination that the third position satisfies the proximity threshold with respect to the second position, merging the first computer-generated object with the second computer-generated object in order to generate a third computer-generated object for modifying the content item. The method includes displaying the third computer-generated object on the display.

In accordance with some implementations, an electronic device includes one or more processors, a non-transitory memory, a display, and an extremity tracker. One or more programs are stored in the non-transitory memory and are configured to be executed by the one or more processors. The one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

DESCRIPTION OF IMPLEMENTATIONS

Figure 1:
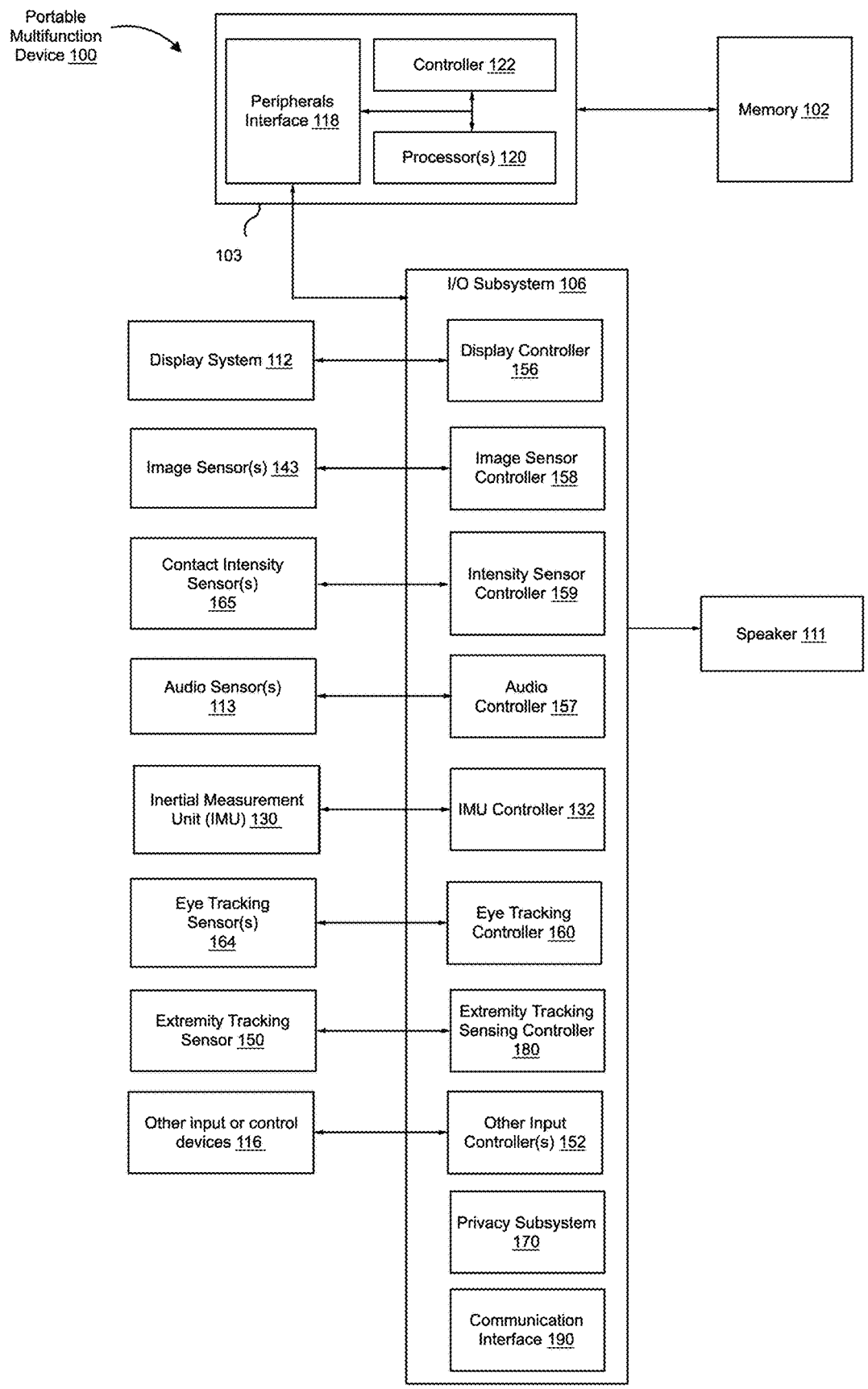
FIG. 1 is a block diagram of an example of a portable multifunction device in accordance with some implementations.

An electronic device, including an integrated input system, may manipulate the display of a computer-generated object based on an input from the integrated input system. For example, the integrated input system includes an extremity tracking input system or an eye tracking input system. As one example, based on an extremity tracking input, the electronic device determines a corresponding extremity of a user that satisfies a proximity threshold with respect to a particular computer-generated object. Accordingly, the electronic device manipulates the particular computer-generated object based on the extremity tracking input. However, utilizing an input from an integrated input system in order to manipulate a computer-generated object introduces a number of issues. For example, when a physical object occludes (e.g., blocks) a portion of a user's extremity, the reliability of the extremity tracking input is correspondingly reduced. As another example, the limited mobility of a user's eyes and the unsteadiness of the user's extremity reduces the efficiency associated with manipulating a computer-generated object. As yet another example, a computer-generated object that has a relatively high depth with respect to the display, such as a computer-generated object located in a scene background, may be difficult for a user to manipulate, thereby introducing extremity tracking and eye tracking inaccuracies.

By contrast, various implementations disclosed herein include methods, electronic devices, and systems for merging a first computer-generated object with a second computer-generated object in order to generate and display a third computer-generated object, based on extremity tracking data from an extremity tracker. For example, the extremity tracking data is from a computer vision system that tracks an extremity of a user within image data. As another example, the extremity tracking data is from a finger-wearable device that is communicatively coupled to an electronic device. To that end, the electronic device includes a display for displaying a plurality of computer-generated objects, and may include a communication interface provided to communicate with the finger-wearable device. The plurality of computer-generated objects includes the first computer-generated object at a first position within an environment and the second computer-generated object at a second position within the environment. The first computer-generated object corresponds to a first user interface element that includes a first set of controls for modifying a content item. The plurality of computer-generated objects may include a combination of content item(s) (e.g., audio content, video content, textual content, database content) and user interface element(s), such as manipulation/editing affordances.

While displaying the plurality of computer-generated objects, the electronic device obtains the extremity tracking data. According to various implementations, the finger manipulation data includes a combination of positional data (e.g., 3D positional data and 3D rotational data) and contact intensity data output from various respective sensors integrated in the finger-wearable device. Based on the extremity tracking data, the electronic device moves the first computer-generated object from the first position to a third position within the environment. In some implementations, moving the first computer-generated object includes selecting (e.g., disambiguating) the first computer-generated object from the plurality of computer-generated objects. For example, based on the finger manipulation data indicating a pinch gesture, the electronic device selects the first computer-generated object. In response to moving the first computer-generated object to the third position, the electronic device determines whether the third position satisfies a proximity threshold with respect to the second position. For example, the third position satisfies the proximity threshold when the third position is less than a threshold distance from the second position. In accordance with a determination that the third position satisfies the proximity threshold, the electronic device merges the first computer-generated object with the second computer-generated object in order to generate a third computer-generated object for modifying the content item. The electronic device displays the third computer-generated object on the display. In some implementations, merging includes ceasing to display the first computer-generated object and the second computer-generated object. In some implementations, merging is further based on determining that the first computer-generated object and the second computer-generated object together satisfy one or more compatibility criteria, such as being associated with a common content type. Accordingly, various implementations disclosed herein enable a user wearing the finger-wearable device to effectively engage with (e.g., manipulate) computer-generated objects.

In some implementations, the electronic device tracks a finger of a user wearing a finger-wearable device with six degrees of freedom (6DOF) based on finger manipulation data, such as 3D rotational data and 3D positional data from respective sensors (e.g., IMU and magnetic sensor) integrated in the finger-wearable device. Accordingly, even when a physical object occludes a portion of the finger-wearable device on the display, the electronic device continues to receive finger manipulation data from the finger-wearable device. On the other hand, other devices that utilize extremity tracking alone cannot track an extremity of a user when a physical object occludes the extremity.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as µLEDs, OLEDs, LEDs, liquid crystal on silicon, laser scanning light source, digital light projection, or combinations thereof An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, a privacy subsystem 170, and a communication interface 190. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, finger-wearable device, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time of flight sensor that obtains depth information characterizing a particular object.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

In some implementations, the display system 112 corresponds to a touch-sensitive display. For example, the display system 112 has a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a finger-wearable device.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

In some implementations, the user optionally makes contact with the display system 112 using any suitable object or appendage, such as a stylus, a finger-wearable device, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order to measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect an eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2:
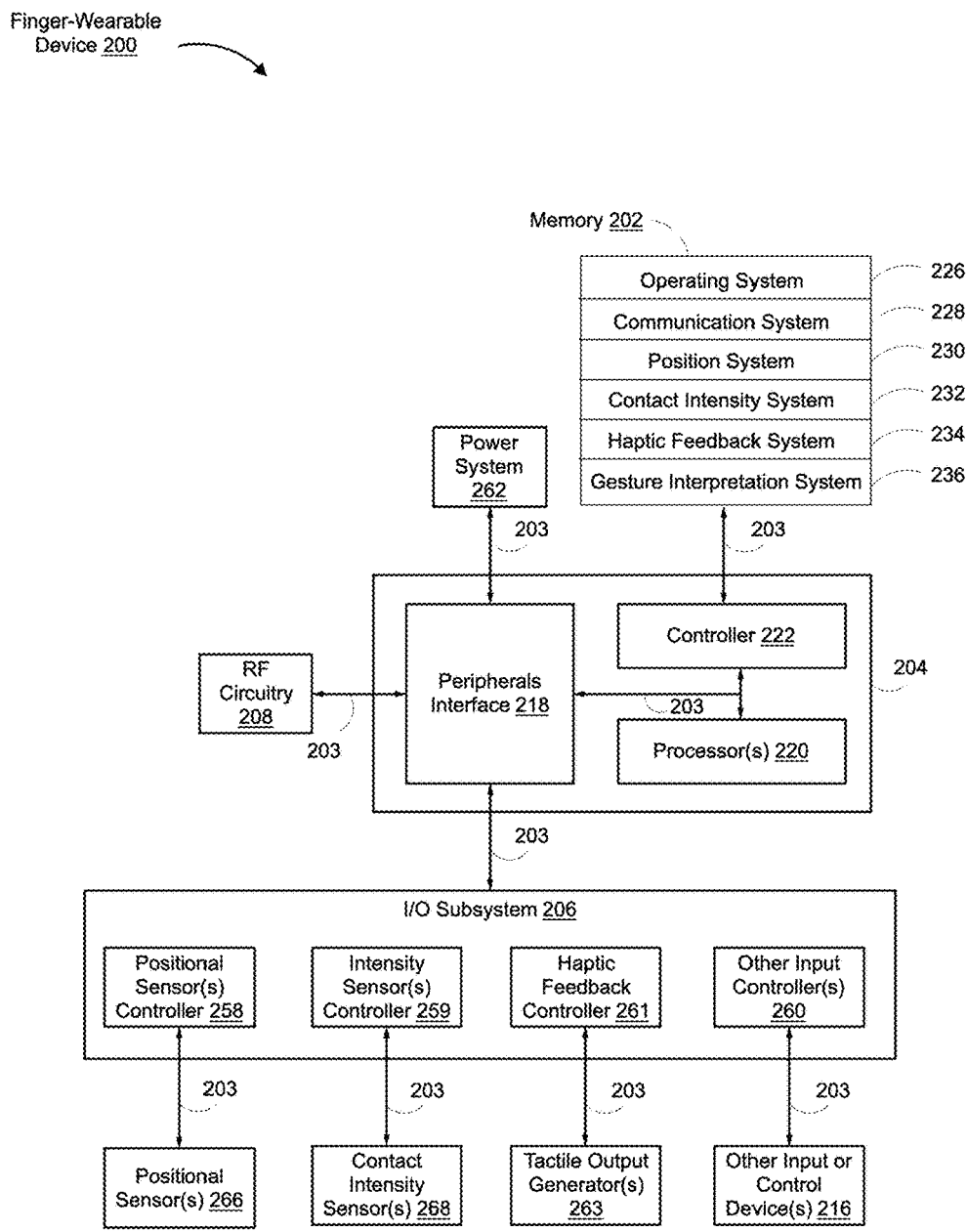
FIG. 2 is a block diagram of an example of a finger-wearable device in accordance with some implementations.
Figure 3A:
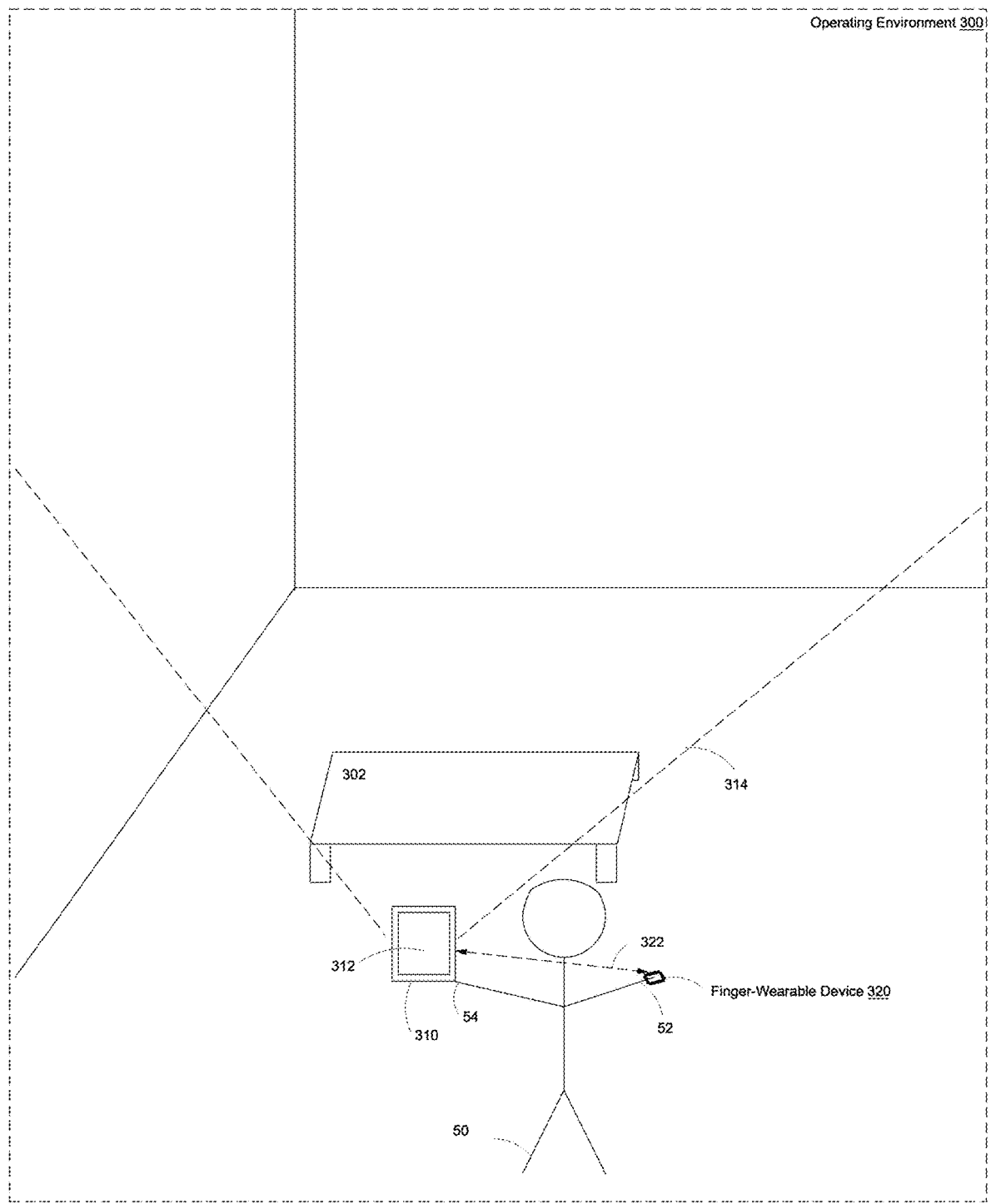
FIGS. 3A-3U are examples of an electronic device merging computer-generated objects with each other in accordance with some implementations.
Figure 3B:
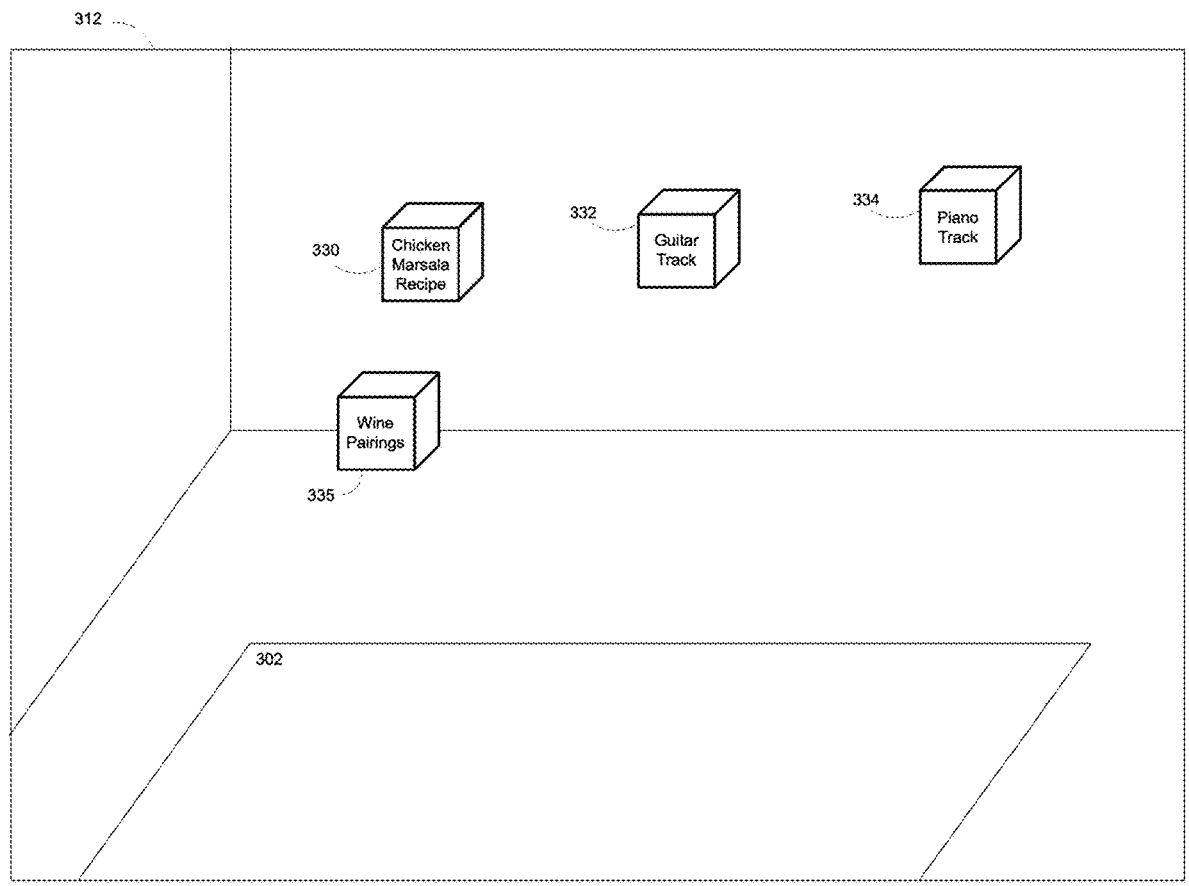
Figure 3C:
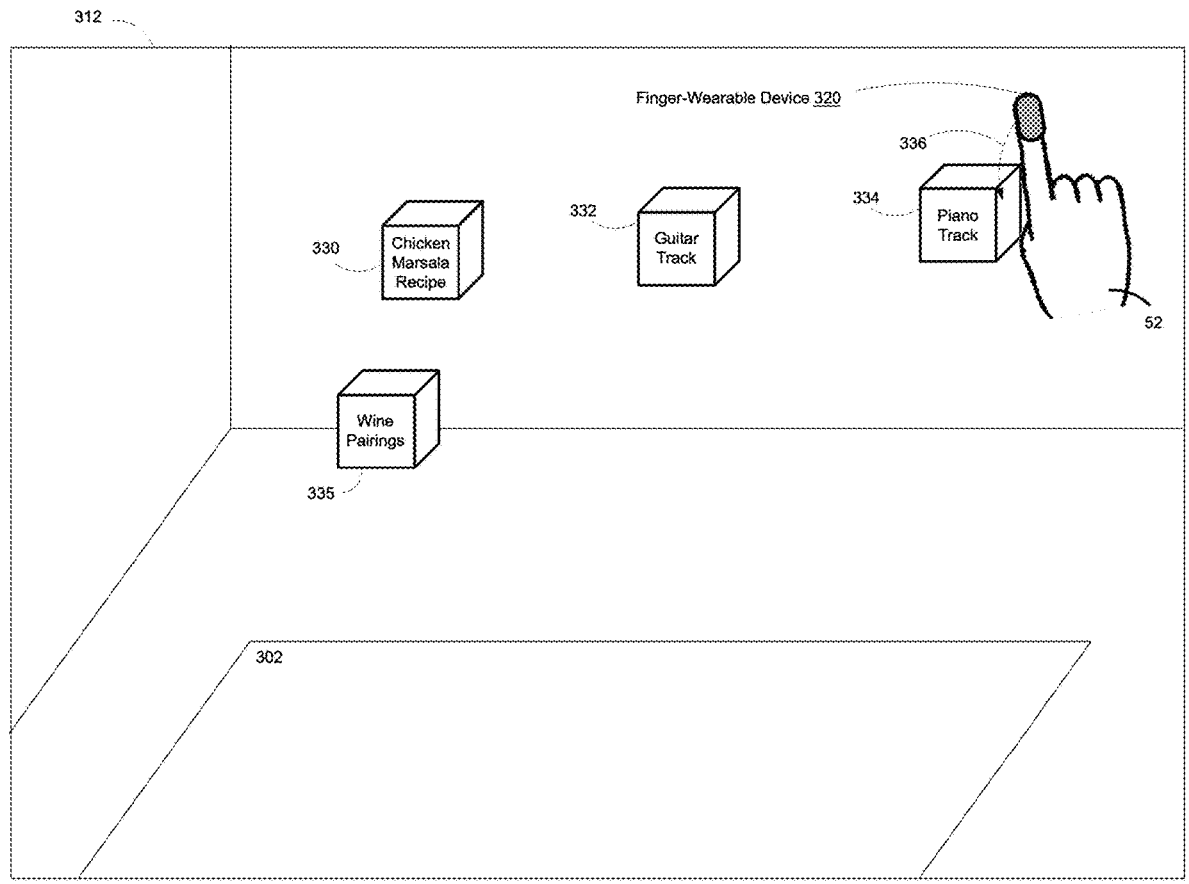
Figure 3D:
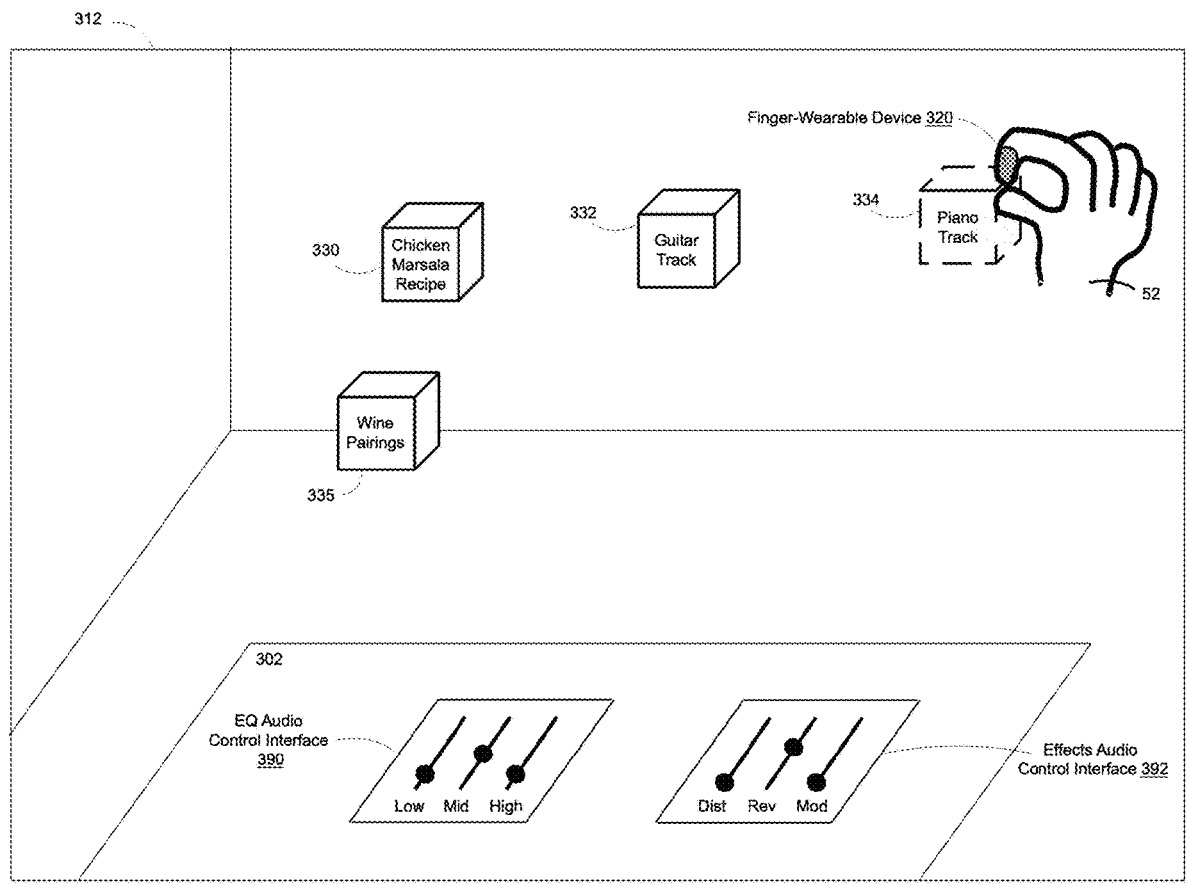
Figure 3E:
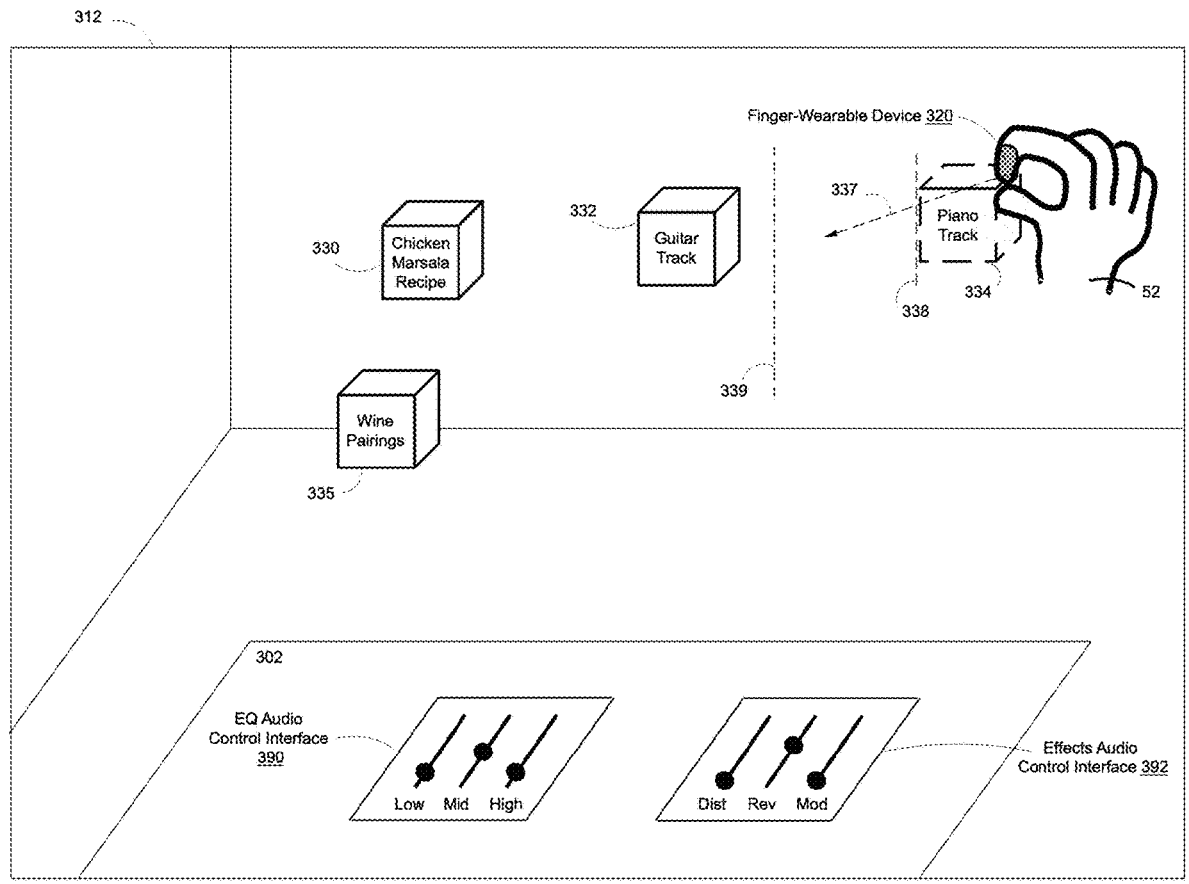
Figure 3F:
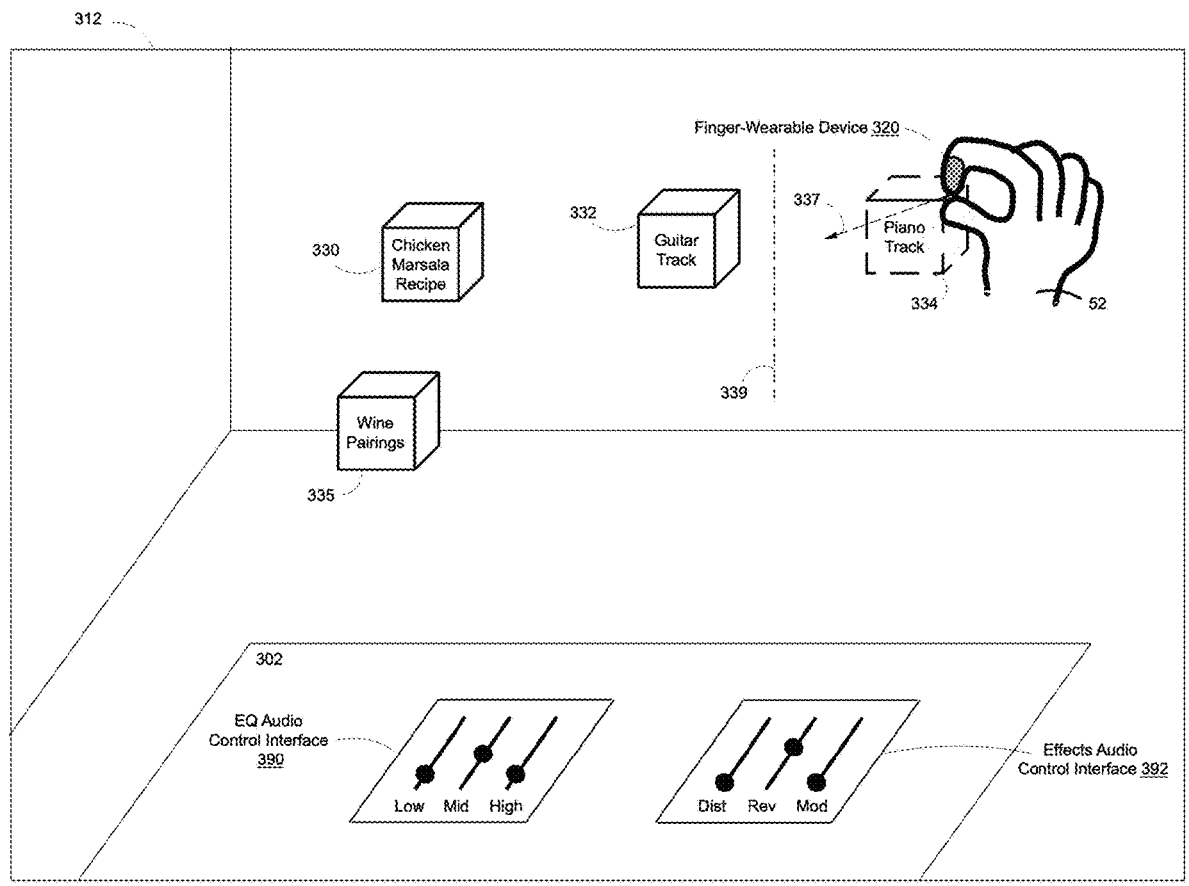
Figure 3G:
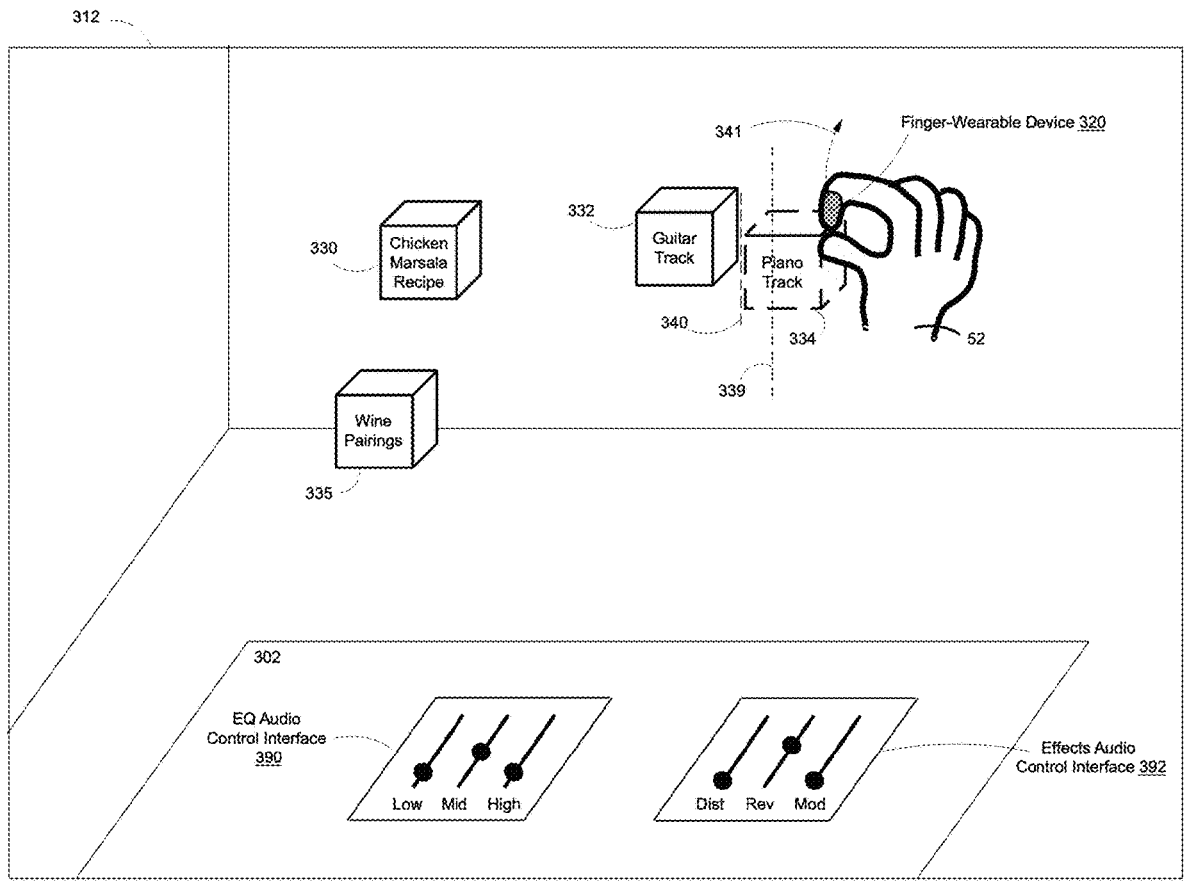
Figure 3H:
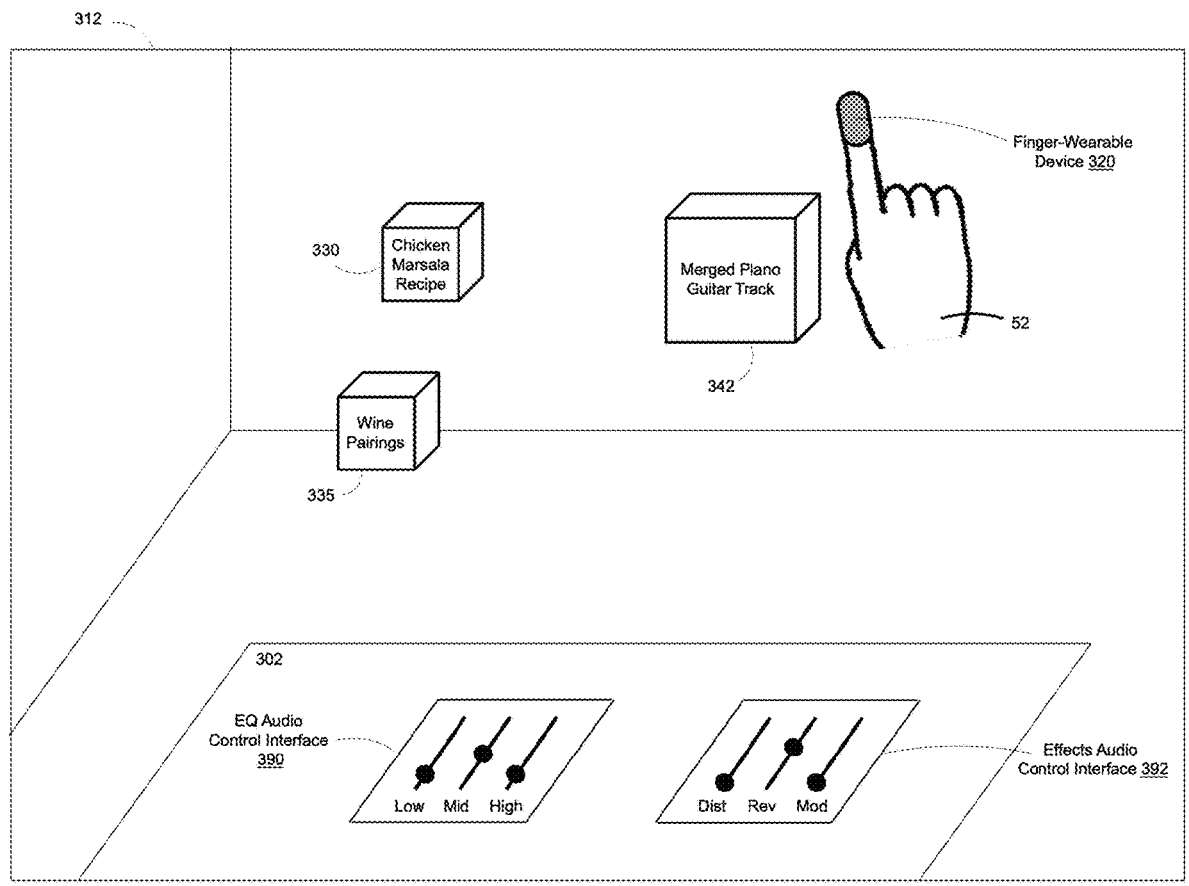
Figure 3I:
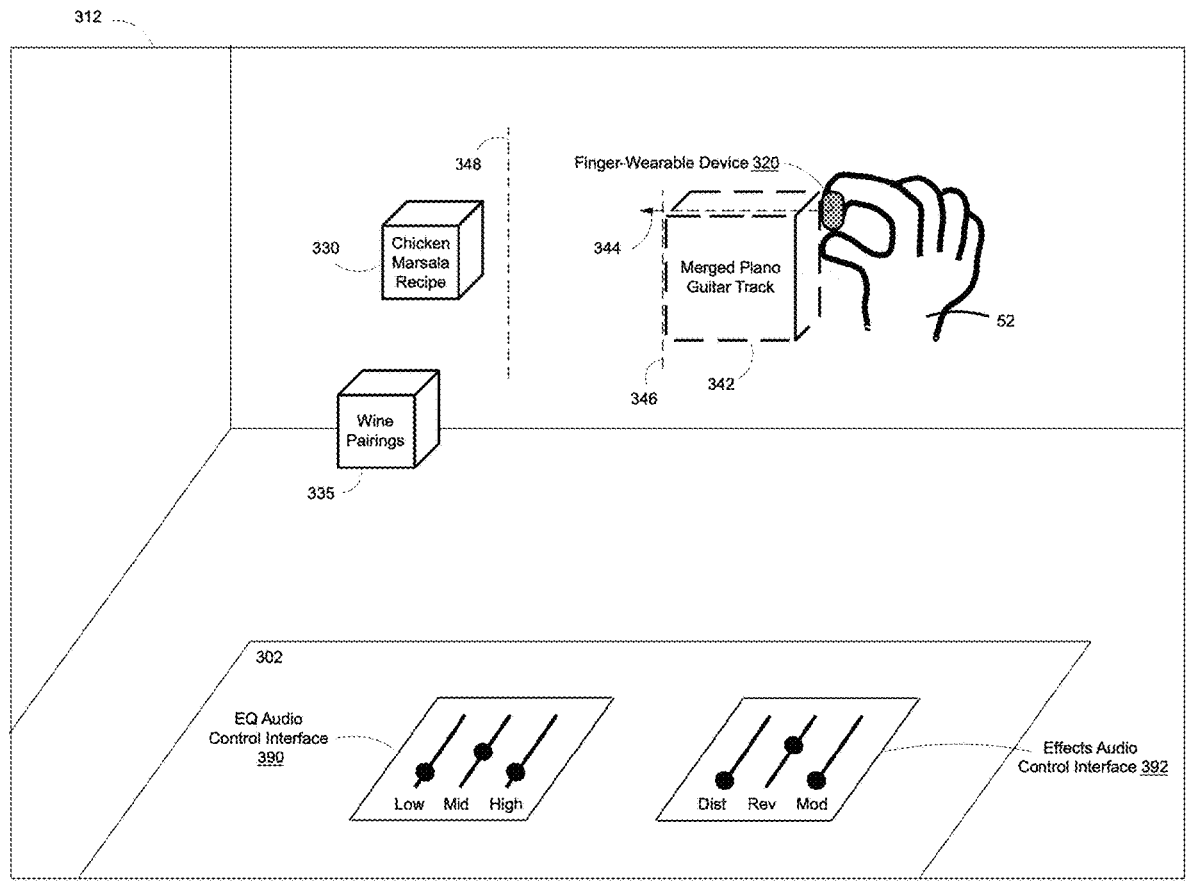
Figure 3J:
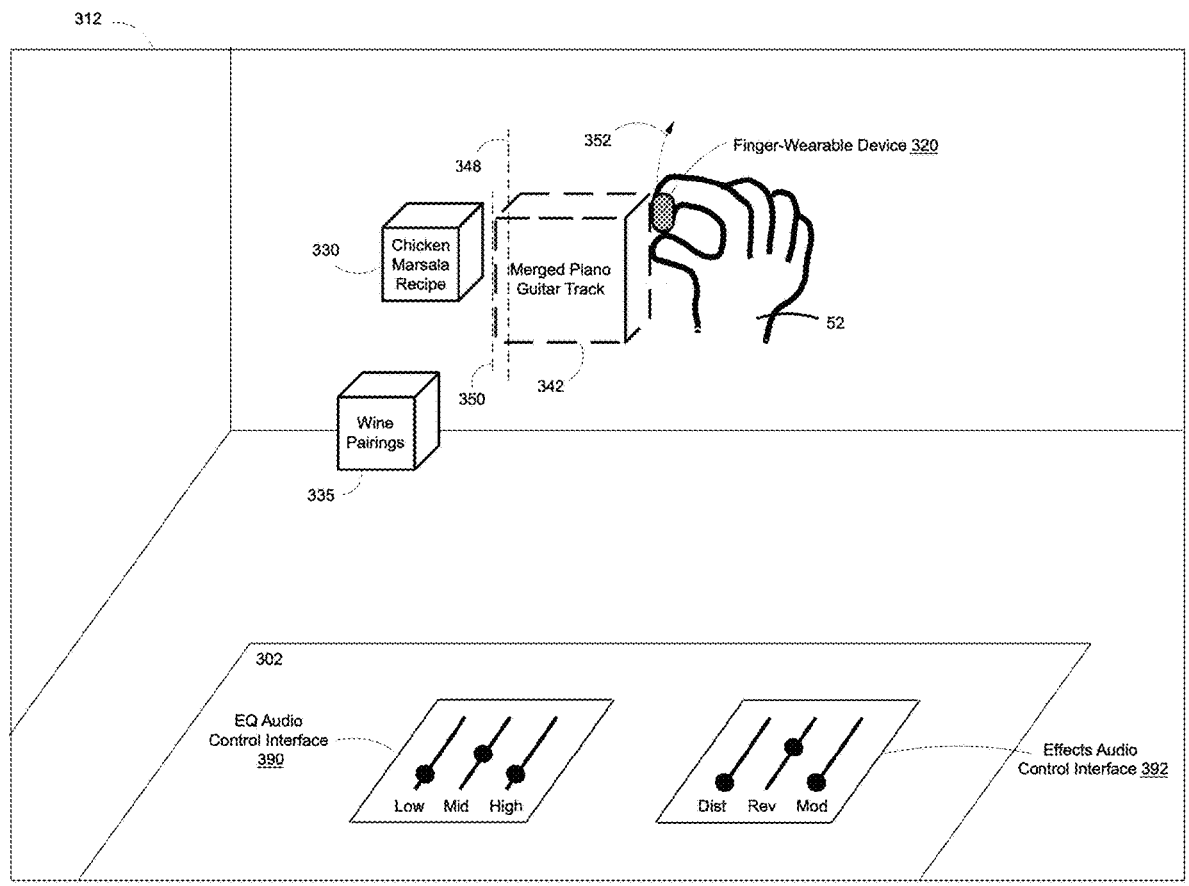
Figure 3K:
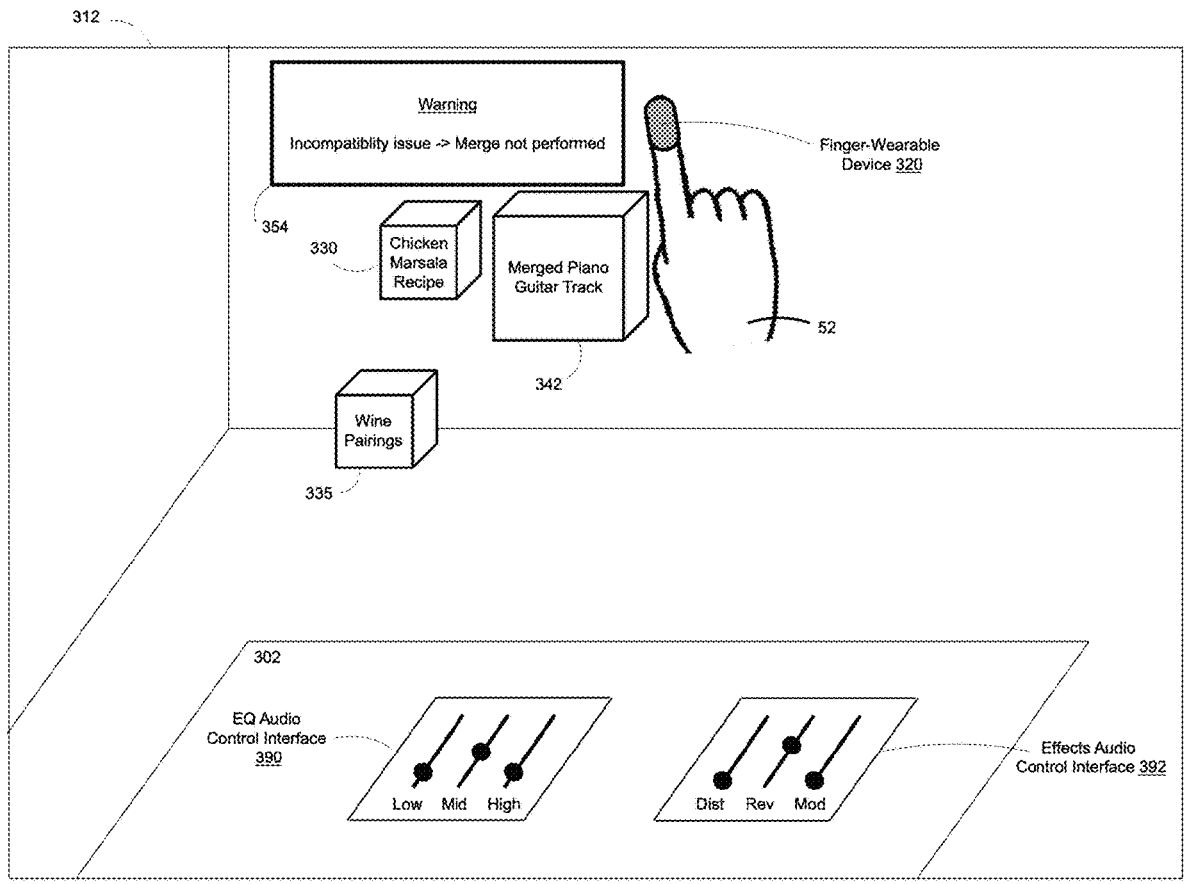
Figure 3L:
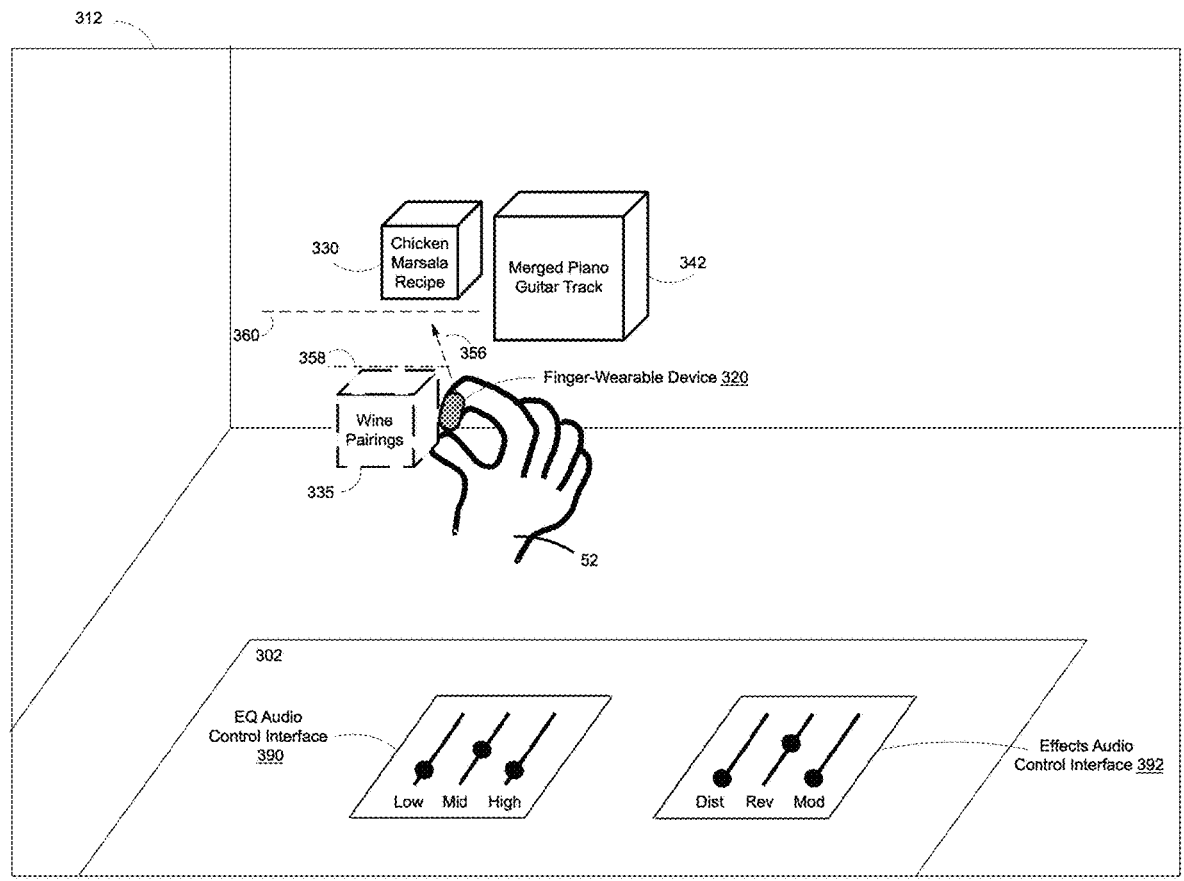
Figure 3M:
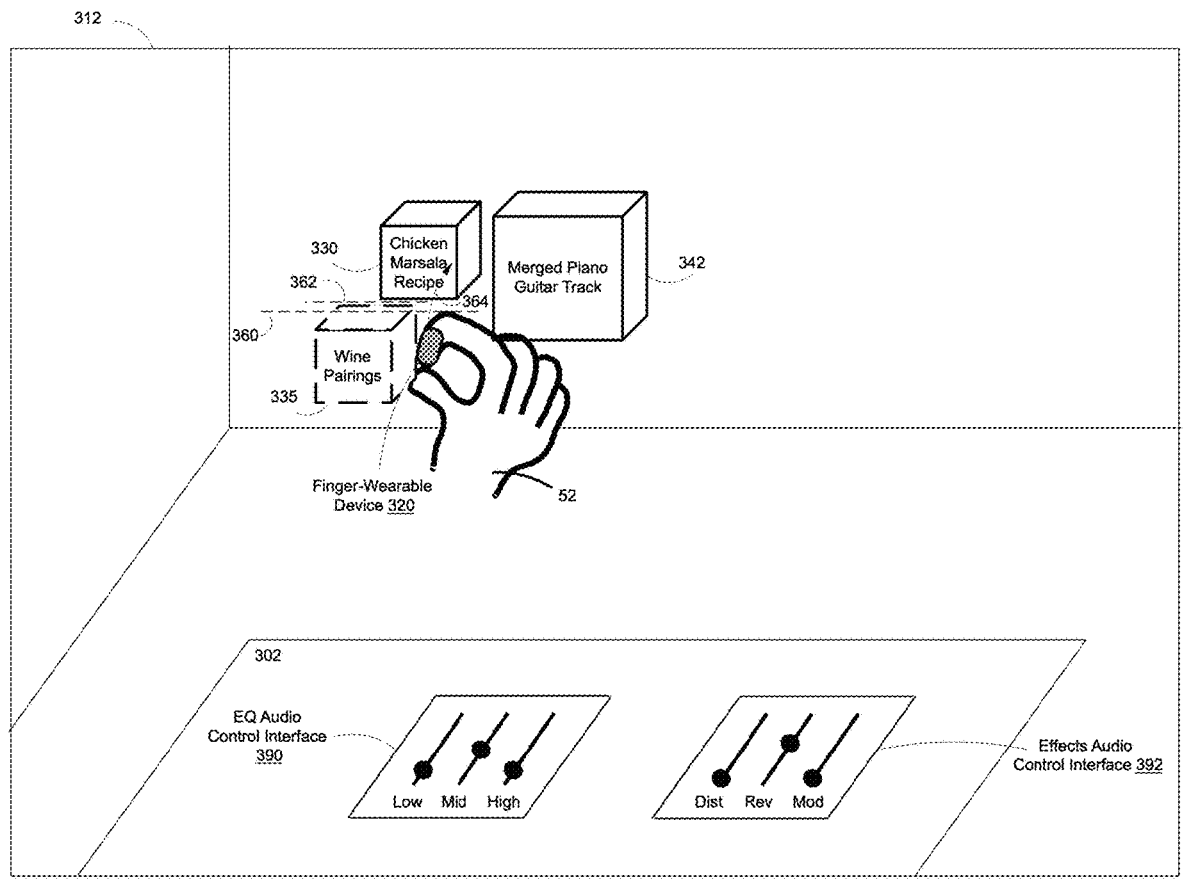
Figure 3N:
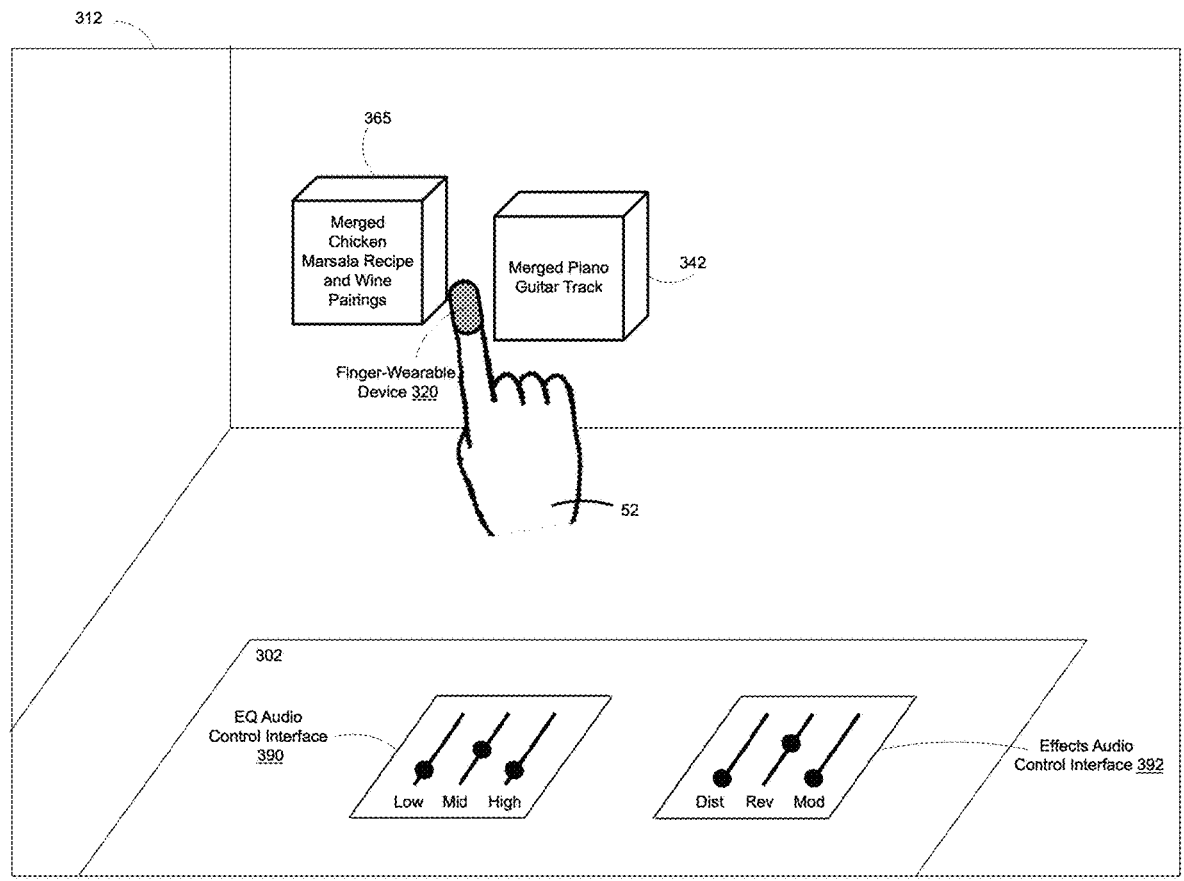
Figure 3O:
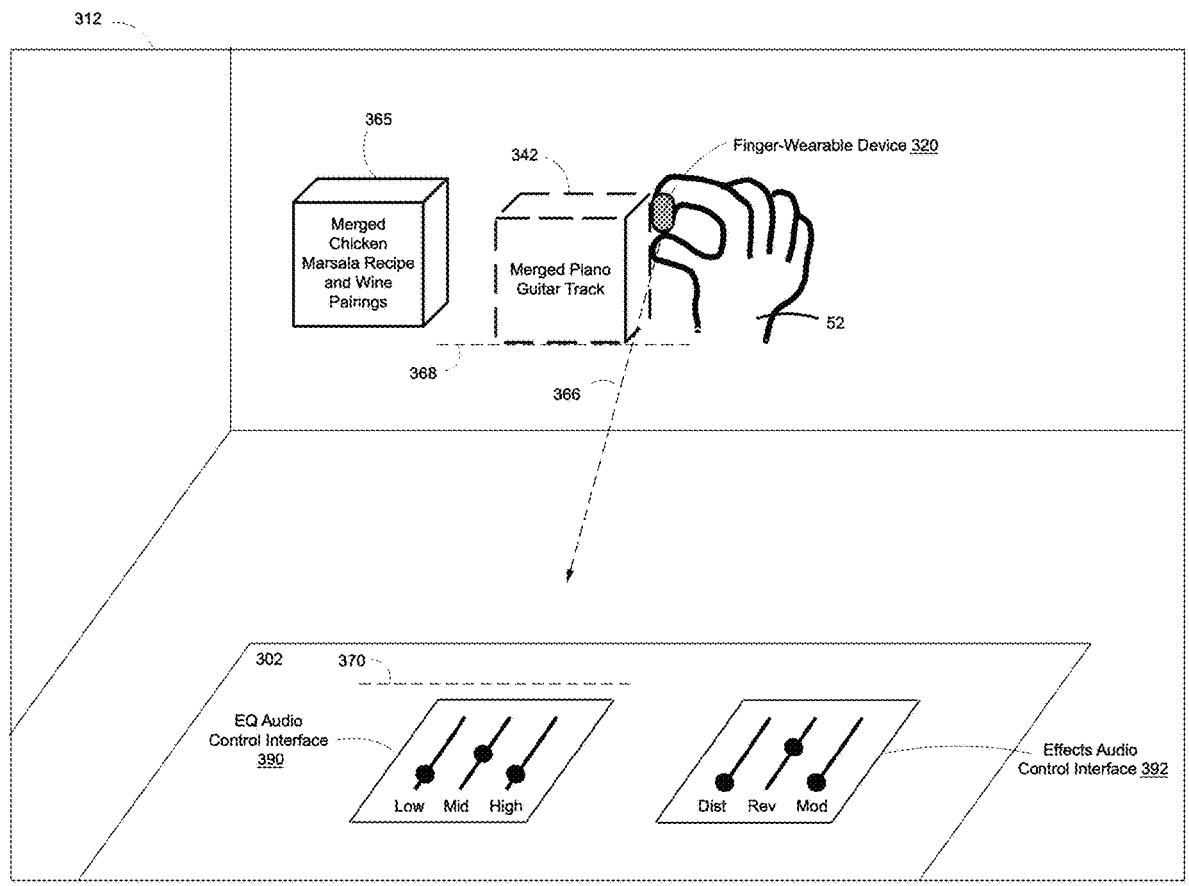
Figure 3P:
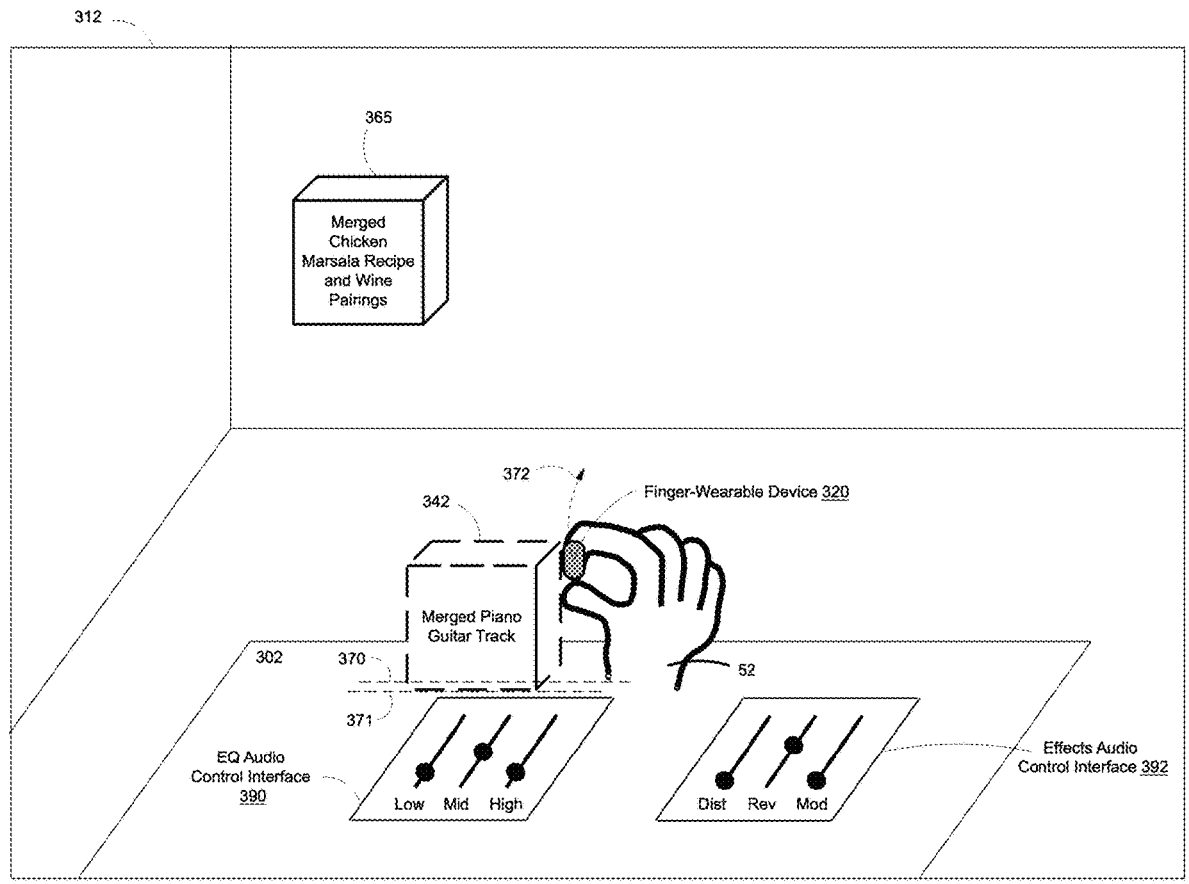
Figure 3Q:
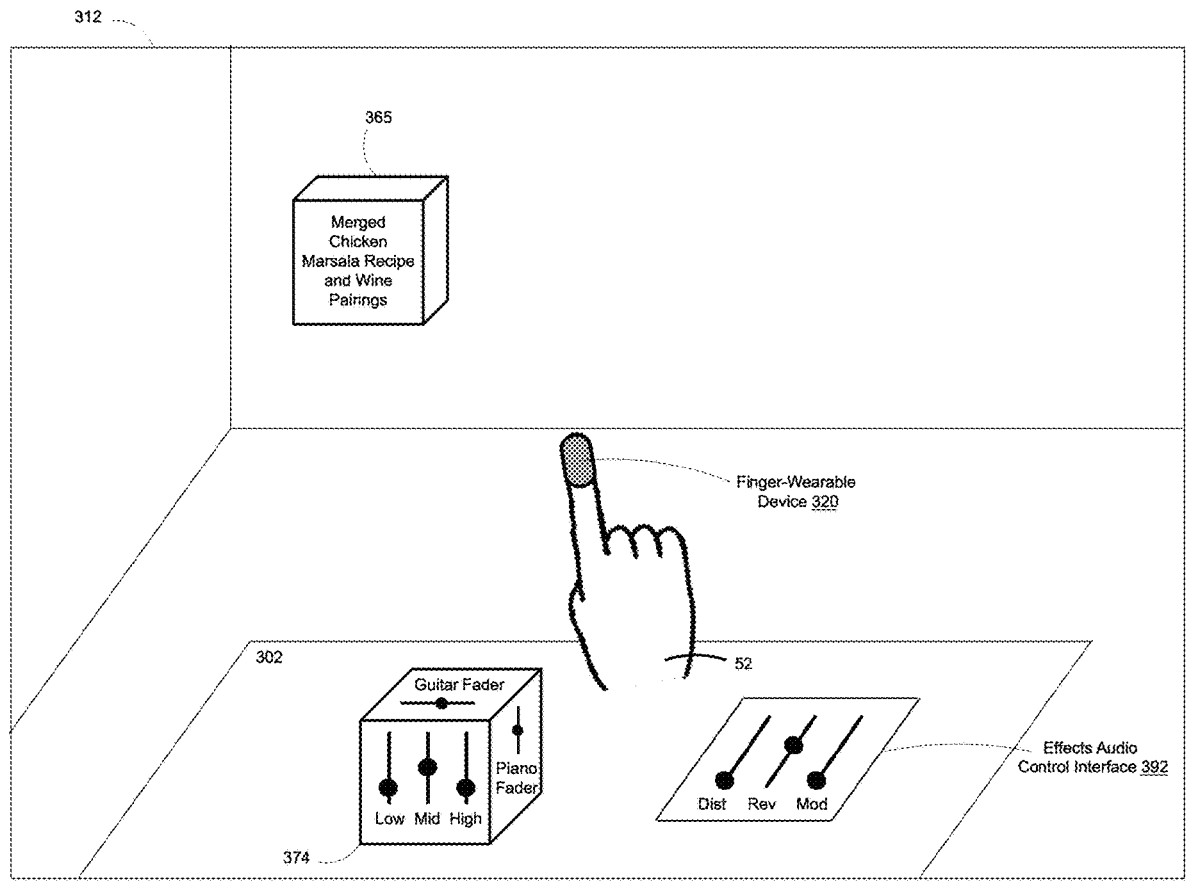
Figure 3R:
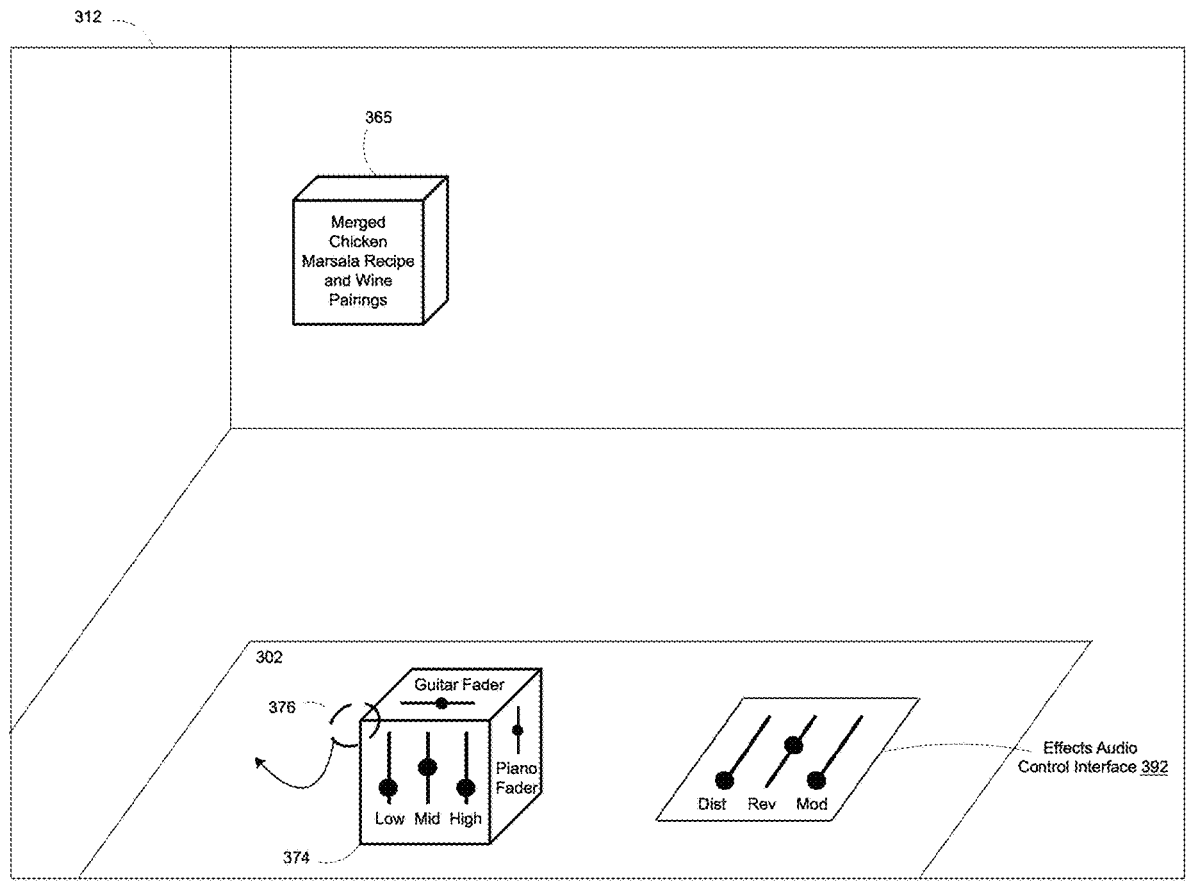
Figure 3S:
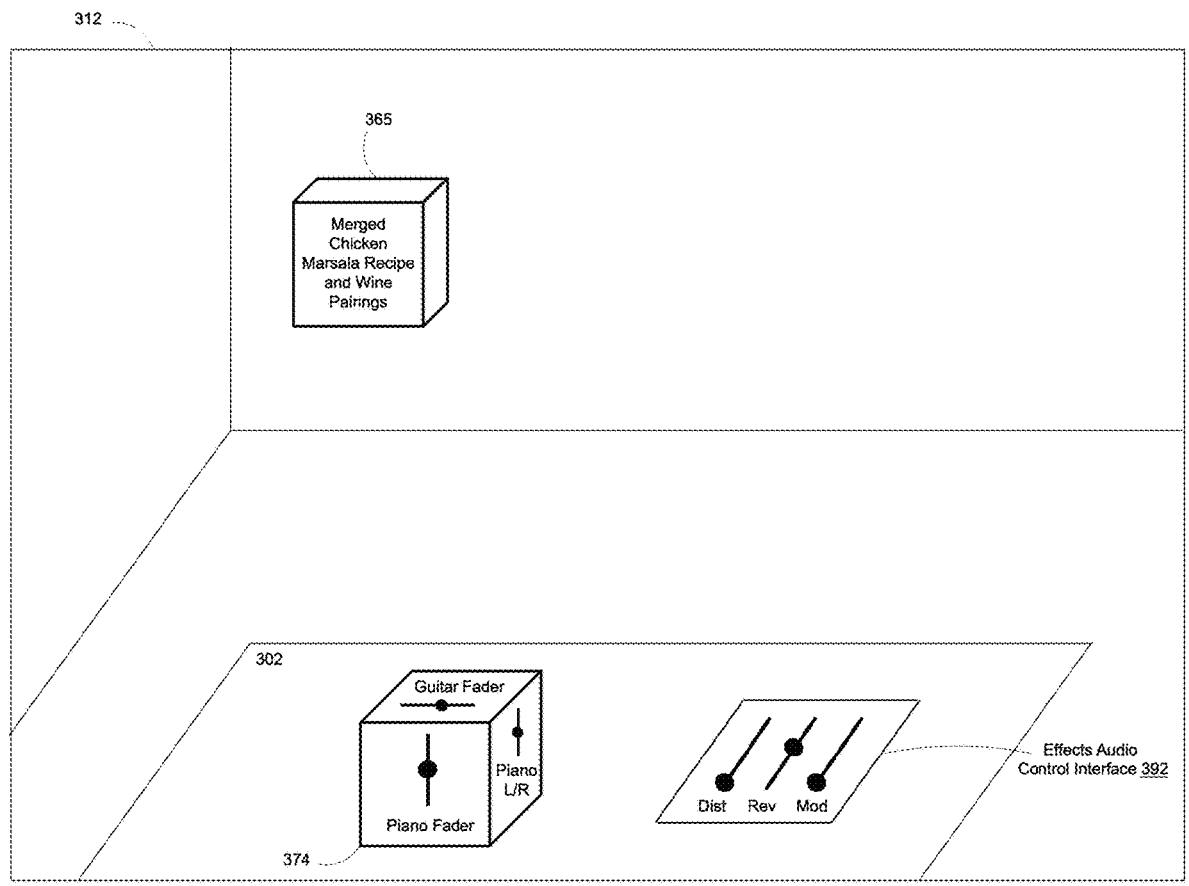
Figure 3T:
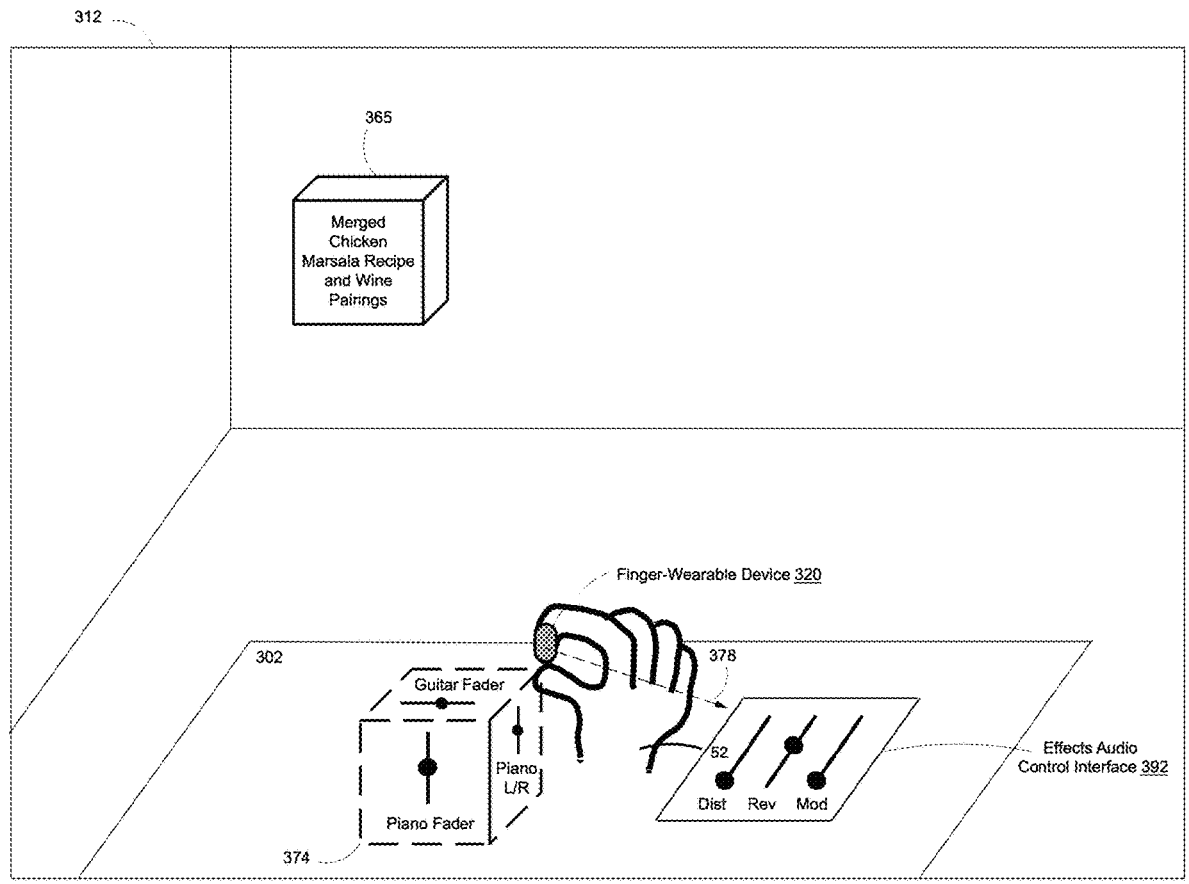
Figure 3U:
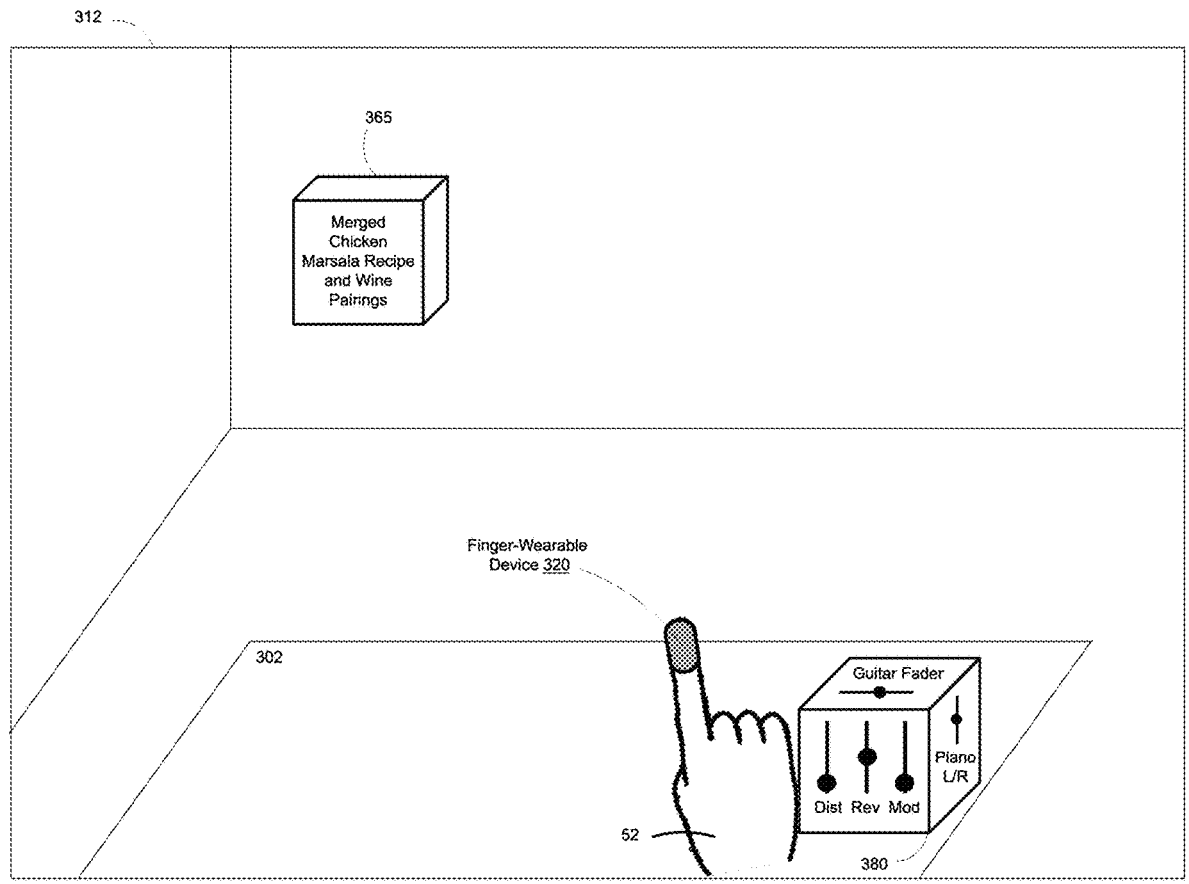

The electronic device 100 includes a communication interface 190 that is provided to communicate with a finger-wearable device, such as the finger-wearable device 200 illustrated in FIG. 2 or the finger-wearable device 320 in FIGS. 3A-3U. For example, the communication interface 190 corresponds to one of a BLUETOOTH interface, IEEE 802.11x interface, near field communication (NFC) interface, and/or the like. According to various implementations, the electronic device 100 obtains finger manipulation data from the finger-wearable device via the communication interface 190, as will be further described below.

FIG. 2 is a block diagram of an example of a finger-wearable device 200. The finger-wearable device 200 includes memory 202 (which optionally includes one or more computer readable storage mediums), a memory controller 222, one or more processing units (CPUs) 220, a peripherals interface 218, RF circuitry 208, and an input/output (I/O) subsystem 206. These components optionally communicate over one or more communication buses or signal lines 203. One of ordinary skill in the art will appreciate that the finger-wearable device 200 illustrated in FIG. 2 is one example of a finger-wearable device, and that the finger-wearable device 200 optionally has more or fewer components than shown, optionally combines two or more components, or optionally has a different configuration or arrangement of the components. The various components shown in FIG. 2 are implemented in hardware, software, firmware, or a combination thereof, including one or more signal processing and/or application specific integrated circuits.

The finger-wearable device 200 includes a power system 262 for powering the various components. The power system 262 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

The memory 202 optionally includes high-speed random-access memory and optionally also includes non-volatile memory, such as one or more flash memory devices, or other non-volatile solid-state memory devices. Access to memory 202 by other components of the finger-wearable device 200, such as CPU(s) 220 and the peripherals interface 218, is, optionally, controlled by a memory controller 222.

The peripherals interface 218 can be used to couple input and output peripherals of the finger-wearable device 200 to the CPU(s) 220 and the memory 202. The one or more processors 220 run or execute various software programs and/or sets of instructions stored in memory 202 to perform various functions for the finger-wearable device 200 and to process data.

In some implementations, the peripherals interface 218, the CPU(s) 220, and the memory controller 222 are, optionally, implemented on a single chip, such as chip 204. In some implementations, they are implemented on separate chips.

The RF (radio frequency) circuitry 208 receives and sends RF signals, also called electromagnetic signals. The RF circuitry 208 converts electrical signals to/from electromagnetic signals and communicates with the electronic device 100 or 310, communications networks, and/or other communications devices via the electromagnetic signals. The RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), BLUETOOTH, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The I/O subsystem 206 couples input/output peripherals on the finger-wearable device 200, such as other input or control devices 216, with the peripherals interface 218. The I/O subsystem 206 optionally includes one or more positional sensor controllers 258, one or more intensity sensor controllers 259, a haptic feedback controller 261, and one or more other input controllers 260 for other input or control devices. The one or more other input controllers 260 receive/send electrical signals from/to other input or control devices 216. The other input or control devices 216 optionally include physical buttons (e.g., push buttons, rocker buttons, etc.), dials, slider switches, click wheels, and so forth. In some implementations, the other input controller(s) 260 are, optionally, coupled with any (or none) of the following: an infrared port and/or a USB port.

In some implementations, the finger-wearable device 200 includes one or more positional sensors 266 that output positional data associated with the finger-wearable device 200. The positional data is indicative of a position, orientation, or movement of the finger-wearable device 200, such as a rotational movement or translational movement of the finger-wearable device 200. For example, the positional sensor(s) 266 include an inertial measurement unit (IMU) that provides 3D rotational data, such as roll, pitch, and yaw information. To that end, the IMU may include a combination of an accelerometer, gyroscopes, and magnetometers. As another example, the positional sensor(s) 266 include a magnetic sensor that provides 3D positional data and/or 3D orientation data, such as the position of the finger-wearable device 200. For example, the magnetic sensor measures weak magnetic fields in order to determine a position of the finger-wearable device 200.

In some implementations, the finger-wearable device 200 includes one or more contact intensity sensors 268 for detecting intensity (e.g., pressure) of a contact of the finger-wearable device 200 on a physical object. The one or more contact intensity sensors 268 output contact intensity data associated with the finger-wearable device 200. As one example, the contact intensity data is indicative of the pressure of a tap gesture associated with the finger-wearable device 200 tapping on a surface of a physical table. The one or more contact intensity sensors 268 may include an interferometer. The one or more contact intensity sensors 268 may include one or more piezoresistive strain gauges, capacitive force sensors, electric force sensors, piezoelectric force sensors, optical force sensors, capacitive touch-sensitive surfaces, or other intensity sensors.

The finger-wearable device 200 optionally includes one or more tactile output generators 263 for generating tactile outputs on the finger-wearable device 200. In some implementations, the term "tactile output" refers to physical displacement of an accessory (e.g., the finger-wearable device 200) of an electronic device (e.g., the electronic device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of the finger-wearable device 200) is, optionally, interpreted by the user as a "click" of a physical actuator button. In some cases, a user will feel a tactile sensation such as a "click" even when there is no movement of a physical actuator button associated with the finger-wearable device that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the electronic device or a component thereof that will generate the described sensory perception for a typical (or average) user.

FIG. 2 shows the tactile output generator(s) 263 coupled with a haptic feedback controller 261. The tactile output generator(s) 263 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the electronic device). The tactile output generator(s) 263 receive tactile feedback generation instructions from a haptic feedback system 234 and generates tactile outputs on the finger-wearable device 200 that are capable of being sensed by a user of the finger-wearable device 200.

In some implementations, the software components stored in the memory 202 include an operating system 226, a communication system (or set of instructions) 228, a position system (or set of instructions) 230, a contact intensity system (or set of instructions) 232, a haptic feedback system (or set of instructions) 234, and a gesture interpretation system (or set of instructions) 236. Furthermore, in some implementations, the memory 202 stores a device/global internal state associated with the finger-wearable device. The device/global internal state includes one or more of: sensor state, including information obtained from the finger wearable device's various sensors and other input or control devices 216; positional state, including information regarding the finger-wearable device's position (e.g., position, orientation, tilt, roll and/or distance) relative to an electronic device (e.g., the electronic device 100); and location information concerning the finger-wearable device's absolute position.

The operating system 226 includes various software components and/or drivers for controlling and managing general system tasks (e.g., memory management, power management, etc.) and facilitates communication between various hardware and software components.

The communication system 228 facilitates communication with other devices (e.g., the electronic device 100 or the electronic device 310), and also includes various software components (e.g., for handling data received by the RF circuitry 208) that are adapted for coupling directly to other devices or indirectly over a network (e.g., the Internet, wireless LAN, etc.).

The position system 230, in conjunction with positional data from the one or more positional sensor(s) 266, optionally detects positional information concerning the finger-wearable device 200. The position system 230 optionally includes software components for performing various operations related to detecting the position of the finger-wearable device 200 and detecting changes to the position of the finger-wearable device 200 in a particular frame of reference. In some implementations, the position system 230 detects the positional state of the finger-wearable device 200 relative to the electronic device and detects changes to the positional state of the finger-wearable device 200 relative to the electronic device. As noted above, in some implementations, the electronic device 100 or 310 determines the positional state of the finger-wearable device 200 relative to the electronic device and changes to the positional state of the finger-wearable device 200 using information from the position system 230.

The contact intensity system 232, in conjunction with contact intensity data from the one or more contact intensity sensor(s) 268, optionally detects contact intensity information associated with the finger-wearable device 200 contacting a physical surface. The contact intensity system 232 includes software components for performing various operations related to detection of contact, such as detecting the intensity and/or duration of a contact between the finger-wearable device 200 and a desk surface. Determining movement of the point of contact, which is represented by a series of contact intensity data, optionally includes determining speed (magnitude), velocity (magnitude and direction), and/or an acceleration (a change in magnitude and/or direction) of the point of contact.

The haptic feedback system 234 includes various software components for generating instructions used by the tactile output generator(s) 263 to produce tactile outputs at one or more locations on finger-wearable device 200 in response to user interactions with the finger-wearable device 200.

The finger-wearable device 200 optionally includes a gesture interpretation system 236. The gesture interpretation system 236 coordinates with the position system 230 and/or the contact intensity system 232 in order to determine a gesture performed by the finger-wearable device. For example, the gesture includes one or more of: a pinch gesture, a pull gesture, a pinch and pull gesture, a rotational gesture, a tap gesture, and/or the like. In some implementations, the finger-wearable device 200 does not include a gesture interpretation system, and an electronic device or a system (e.g., the gesture interpretation system 445 in FIG. 4) determines a gesture performed by the finger-wearable device 200 based on finger manipulation data from the finger-wearable device 200. In some implementations, a portion of the gesture determination is performed at the finger-wearable device 200, and a portion of the gesture determination is performed at an electronic device/system. In some implementations, the gesture interpretation system 236 determines a time duration associated with a gesture. In some implementations, the gesture interpretation system 236 determines a contact intensity associated with a gesture, such as an amount of pressure associated with the finger-wearable device 200 tapping on a physical surface.

Each of the above identified modules and applications correspond to a set of executable instructions for performing one or more functions described above and the methods described in this application (e.g., the computer-implemented methods and other information processing methods described herein). These systems (i.e., sets of instructions) need not be implemented as separate software programs, procedures or modules, and thus various subsets of these modules are, optionally, combined or otherwise re-arranged in various embodiments. In some implementations, the memory 202 optionally stores a subset of the systems and data structures identified above. Furthermore, the memory 202 optionally stores additional systems and data structures not described above.

FIGS. 3A-3U are examples of an electronic device 310 merging computer-generated objects with each other in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. Although the examples described with reference to FIGS. 3A-3U include utilizing finger manipulation data from a finger-wearable device for merging, one of ordinary skill in the art will appreciate that some implementations include the electronic device 310 merging computer-generated objects independently of data from a separate device. For example, in some implementations, the electronic device 310 performs computer vision in order to track an extremity of a user, such as via image based instance segmentation or semantic segmentation.

As illustrated in FIG. 3A, an electronic device 310 is associated with (e.g., operates according to) an operating environment 300. In some implementations, the electronic device 310 is similar to and adapted from the electronic device 100 in FIG. 1. In some implementations, the electronic device 310 generates one of the XR settings described above.

The electronic device 310 includes a display 312 that is associated with a viewable region 314 of the operating environment 300. For example, in some implementations, the electronic device 310 includes an image sensor associated with a field-of-view corresponding to the viewable region 314, and the electronic device 310 composites pass-through image data from the image sensor with computer-generated content. As another example, in some implementations, the electronic device 310 includes a see-through display 312 that enables ambient light to enter from a portion of a physical environment that is associated with the viewable region 314. The operating environment 300 includes a physical table 302, and the viewable region 314 includes a portion of the physical table 302.

A finger-wearable device 320 is worn on a finger of a first hand 52 of a user 50. In some implementations, the finger-wearable device 320 is similar to and adapted from the finger-wearable device 200 illustrated in FIG. 2.

The electronic device 310 includes a communication interface (e.g., the communication interface 190 in FIG. 1) that is provided to communicate with the finger-wearable device 320. The electronic device 310 establishes a communication link with the finger-wearable device 320, as is indicated by a communication link line 322. Establishing the link between the electronic device 310 and the finger-wearable device 320 may be referred to as pairing or tethering. One of ordinary skill in the art will appreciate that the electronic device 310 may communicate with the finger-wearable device 320 according to a variety of communication protocols, such as BLUETOOTH, IEEE 802.11x, NFC, etc. The electronic device 310 obtains finger manipulation data from the finger-wearable device 320 via the communication interface. For example, the electronic device 310 obtains a combination of positional data (e.g., output by positional sensor(s) of the finger-wearable device 320) and contact intensity data (e.g., output by contact intensity sensor(s) of the finger-wearable device 320).

In some implementations, a second hand 54 of the user 50 is holding the electronic device 310. For example, in some implementations, the electronic device 310 corresponds to one of a smartphone, laptop, tablet, etc.

In some implementations, the electronic device 310 corresponds to a head-mountable device (HMD) that includes an integrated display (e.g., a built-in display) that displays a representation of the operating environment 300. In some implementations, the electronic device 310 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 310). For example, in some implementations, the electronic device 310 slides/snaps into or otherwise attaches to the head-mountable enclosure. In some implementations, the display of the device attached to the head-mountable enclosure presents (e.g., displays) the representation of the operating environment 300. For example, in some implementations, the electronic device 310 corresponds to a mobile phone that can be attached to the head-mountable enclosure.

In some implementations, the electronic device 310 includes an image sensor, such as a scene camera. For example, the image sensor obtains image data that characterizes the operating environment 300, and the electronic device 310 composites the image data with computer-generated content in order to generate display data for display on the display 312. The display data may be characterized by an XR environment. For example, the image sensor obtains image data that represents the portion of the physical table 302, and the generated display data displayed on the display 312 displays respective representations of the portion of the physical table 302 (See FIG. 3B).

In some implementations, the electronic device 310 includes a see-through display. The see-through display permits ambient light from the physical environment through the see-through display, and the representation of the physical environment is a function of the ambient light. For example, the see-through display is a translucent display, such as glasses with optical see-through. In some implementations, the see-through display is an additive display that enables optical see-through of the physical surface, such as an optical HMD (OHMD). For example, unlike purely compositing using a video stream, the additive display is capable of reflecting projected images off of the display while enabling the user 50 to see through the display.

In some implementations, the see-through display includes a photochromic lens. The HMD adds computer-generated objects to the ambient light entering the see-through display in order to enable display of the operating environment 300. For example, a see-through display 312 permits ambient light from the operating environment 300 that includes the portion of the physical table 302, and thus the see-through display 312 displays respective representations of the portion of the physical table 302 (See FIG. 3B).

As illustrated in FIG. 3B, the electronic device 310 displays, on the display 312, a representation of the portion of the physical table 302 (hereinafter sometimes referred to as "the portion of the physical table 302" or the "physical table 302" for the sake of brevity).

Moreover, the electronic device 310 displays, on the display 312, a plurality of computer-generated objects. A particular one of the plurality of computer-generated objects may represent one of a variety of content types, such as audio content, video content, image content, file content, textual content, metadata content, database content, and/or the like. For example, as illustrated in FIG. 3B, the plurality of computer-generated objects includes a chicken marsala recipe 330 (e.g., text and pictures indicating how to make chicken marsala), a guitar track 332 (e.g., guitar audio content), a piano track 334 (e.g., piano audio content), and wine pairings 335 (e.g., text and pictures indicating pairings of wines with foods). In some implementations, a particular one of the plurality of computer-generated objects includes manipulation affordance(s). For example, one or more of the guitar track 332 and the piano track 334 include affordances for engaging with respective audio content, such as one or more playback affordances (e.g., play, pause, stop, rewind, etc.). As another example, one or more of the chicken marsala recipe 330 and the wine pairings 335 include affordances for editing respective textual/image content, such as one or more annotation affordances (e.g., pencil, marker, eraser, ruler, etc.).

As illustrated in FIG. 3C, the finger-wearable device 320 moves to within the viewable region 314, and thus the display 312 displays a representation of the finger-wearable device 320 (hereinafter sometimes "the finger-wearable device 320" for the sake of brevity). In some implementations, as illustrated in FIGS. 3C and 3D, the finger-wearable device 320 performs a pinch gesture, as indicated by pinch line 336. The pinch line 336 is illustrated for purely explanatory purposes. As the finger-wearable device 320 performs the pinch gesture, the electronic device 310 obtains finger manipulation data from the finger-wearable device 320. The finger manipulation data may include a combination of positional data and contact intensity data. For example, the positional data includes 3D rotational data (e.g., from an IMU sensor integrated in the finger-wearable device 320) and 3D positional data (e.g., from a magnetic sensor integrated in the finger-wearable device 320).

Based on the finger manipulation data, the electronic device 310 determines that the finger-wearable device 320 performs the pinch gesture. For example, the electronic device 310 determines that the finger-wearable device 320 rotates based on IMU data (e.g., a roll value, a pitch value, and a yaw value) included in the finger manipulation data. As another example, the electronic device 310 determines a positional change associated with the finger-wearable device 320 based on magnetic sensor data included in the finger manipulation data. Accordingly, the electronic device 310 determines that the finger-wearable device 320 performs the pinch gesture based on a combination of the IMU data and the magnetic sensor data. In some implementations, upon detecting the start of the pinch gesture, the electronic device 310 displays, on the display 312, a visualization of the pinch gesture.

Moreover, in some implementations, the electronic device 310 determines, based on the finger manipulation data, that the pinch gesture is associated with the piano track 334. For example, as illustrated in FIG. 3D, based on magnetic sensor data, the electronic device 310 determines that finger-wearable device 320 is less than a threshold distance from the piano track 334 upon termination of the pinch gesture.

In some implementations, the electronic device 310 selects the piano track 334 based on the finger manipulation data. For example, in response to determining that the finger-wearable device 320 performs the pinch gesture and that the pinch gesture is less than a threshold distance from the piano track 334, the electronic device 310 selects the piano track 334. One of ordinary skill in the art will appreciate that, in some implementations, the electronic device 310 selects a particular computer-generated object based on a different gesture type (e.g., tap, double tap), or selects a particular computer-generated object based on satisfaction of a distance threshold and independent of gesture type. For example, in some implementations, in response to determining that finger manipulation data indicates that the finger-wearable device 320 satisfies a proximity threshold (e.g., is positioned within) a particular computer-generated object, electronic device 310 selects the particular computer-generated object, independent of a gesture performed by the finger-wearable device 320.

In some implementations, the electronic device 310 utilizes a secondary input (e.g., eye gaze data or extremity tracking data) in order to select the piano track 334. For example, based on eye gaze data indicating that the user 50 is focused on the piano track 334, the electronic device 310 selects the piano track 334 in response to detecting the pinch gesture, even when the finger-wearable device 320 is not within a threshold distance from the piano track 334. For example, while performing the tap gesture the finger-wearable device 320 is outside the viewable region of the display 312 or inside the viewable region but beyond a threshold distance from the piano track 334.

In some implementations, the electronic device 310 displays an indication of the selection. Namely, as illustrated in FIG. 3D, the electronic device 310 changes an appearance of the piano track 334 from a solid line boundary to a dotted line boundary. Displaying the indicator provides feedback to the user 50, thereby reducing erroneous (e.g., unintended) inputs from the finger-wearable device 320 and reducing resource utilization by the electronic device 310.

In some implementations, in response to selecting the piano track 334, the electronic device 310 displays, on the display 312, one or more user interface elements that are associated with the piano track 334. Namely, as illustrated in FIG. 3D, the electronic device 310 displays, on the display 312, an equalizer (EQ) audio control interface 390 and an effects audio control interface 392 that enable the user 50 to edit the piano track 334. The EQ audio control interface 390 enables the user 50 to control the frequency (e.g., pitch) of audio content via various EQ affordances (low, mid, high), whereas the effects audio control interface 392 enables the user 50 to add effects to the audio content via various effects affordances (e.g., distortion, reverb, modulation). In some implementations, as illustrated in FIG. 3D, the electronic device 310 displays a user interface element overlaid on a physical object (e.g., the physical table 302). To that end, in some implementations, the electronic device 310 performs a computer-vision technique (e.g., instance segmentation or semantic segmentation), optionally with the aid of a neural network, in order to identify a physical object within the scene. By foregoing display of the one or more user interface elements until selection of a particular computer-generated object, the electronic device 310 reduces resource utilization. As a counterexample, in response to selecting the chicken marsala recipe 330, the electronic device 310 does not display an audio control interface because an audio control interface is not compatible with (e.g., cannot edit) textual/image content that is associated with the chicken marsala recipe 330.

As illustrated in FIGS. 3E-3G, the finger-wearable device 320 performs a downwards and leftwards movement of the piano track 334, as indicated by movement line 337 (illustrated for purely explanatory purposes). Based on finger manipulation data from the finger-wearable device 320 as the finger-wearable device 320 performs the movement, the electronic device 310 correspondingly moves the piano track 334 downwards and leftwards.

As illustrated in FIG. 3E, before movement of the finger-wearable device 320 begins, the piano track 334 is positioned at a first position within an environment, as indicated by a first position line 338 (illustrated for purely explanatory purposes). Namely, the left edge of the piano track 334 is positioned at the first position. One of ordinary skill in the art will appreciate that, in some implementations, a different location of the piano track 334 is used as a reference location, such as the center of the piano track 334 or a different edge of the piano track 334. As further illustrated in FIG. 3E, a proximity threshold with respect to the guitar track 332 is indicated by a proximity threshold line 339 (illustrated for purely explanatory purposes).

As illustrated in FIGS. 3F and 3G, the finger-wearable device 320 finishes the movement, and the electronic device 310 correspondingly finishes moving the piano track 334. Namely, the electronic device 310 moves the left edge of the piano track 334 from the first position illustrated in FIG. 3E to a second position within the environment, as indicated by a second position line 340 (illustrated for purely explanatory purposes) in FIG. 3G. Notably, the second position (the second position line 340) is beyond (e.g., crosses) the proximity threshold (the proximity threshold line 339). In other words, the second position line 340 is closer to the guitar track 332 than is the proximity threshold line 339. Accordingly, the electronic device 310 determines that the second position satisfies the proximity threshold with respect to the guitar track 332.

In response to determining that the second position satisfies the proximity threshold, the electronic device 310 merges the piano track 334 with the guitar track 332. In some implementations, merging is in further response to determining that the finger manipulation data is indicative of a de-selection gesture, such as a de-pinch gesture type (sometimes referred to as a "pinch release gesture"). For example, as illustrated in FIG. 3G, the finger-wearable device 320 performs a de-pinch gesture, as indicated by a de-pinch line 341 (illustrated for purely explanatory purposes). Based on finger manipulation data indicative of the de-pinch gesture, the electronic device 310 merges the piano track 334 with the guitar track 332, and displays a merged piano guitar track 342, as illustrated in FIG. 3H. The merged piano guitar track 342 includes respective audio content associated with the piano track 334 and the guitar track 332. For example, the merged piano guitar track 342 may represent piano audio content that is temporally aligned with guitar audio content. In some implementations, merging includes ceasing to display the piano track 334 and the guitar track 332, as illustrated in FIG. 3H. Although the merged piano guitar track 342 appears larger than the individual respective piano track 334 and guitar track 332, one of ordinary skill in the art will appreciate that a merged computer-generated object may have any type of appearance, including a dimensional change (e.g., from a two-dimensional (2D) object to a three-dimensional (3D) object or vice versa)

In some implementations, merging is in further response to determining that the piano track 334 and the guitar track 332 together satisfy one or more compatibility criteria, such as both being associated with audio content. A counterexample is provided with reference to FIGS. 3I-3K.

As illustrated in FIGS. 3I-3K, the electronic device 310 foregoes merging computer-generated objects based on determining that one or more compatibility criteria are not satisfied. As illustrated in FIG. 3I, after selecting the merged piano guitar track 342 (e.g., via a pinch gesture), the finger-wearable device 320 begins a leftwards movement of the merged piano guitar track 342 towards the chicken marsala recipe 330. The leftwards movement is indicated by movement line 344 (illustrated for purely explanatory purposes). Before movement of the merged piano guitar track 342, the merged piano guitar track 342 is positioned at a third position within the environment, as indicated by a third position line 346 (illustrated for purely explanatory purposes). As further illustrated in FIG. 3I, a proximity threshold with respect to the chicken marsala recipe 330 is indicated by a proximity threshold line 348 (illustrated for purely explanatory purposes).

As illustrated in FIG. 3J, finger-wearable device 320 finishes the leftwards movement, and the electronic device 310 correspondingly moves the merged piano guitar track 342 to a fourth position, as indicated by a fourth position line 350 (illustrated for purely explanatory purposes). Notably, the fourth position line 346 is closer to the chicken marsala recipe 330 than is the proximity threshold line 348. Accordingly, the electronic device 310 determines that the fourth position satisfies the proximity threshold with respect to the chicken marsala recipe 330.

As further illustrated in FIG. 3J, the finger-wearable device 320 performs a de-pinch gesture, as indicated by de-pinch line 352 (illustrated for purely explanatory purposes). However, in response to determining (based on finger manipulation data) that the finger-wearable device 320 performs the de-pinch gesture, the electronic device 310 foregoes merging the merged piano guitar track 342 with the chicken marsala recipe 330. Namely, the electronic device 310 determines that the merged piano guitar track 342 and the chicken marsala recipe 330 together do not satisfy one or more compatibility criteria. For example, the electronic device 310 identifies that the merged piano guitar track 342 is associated with audio content and that the chicken marsala recipe 330 is associated with textual/image content, and determines that the audio content is not compatible with (e.g., of a different content type) the textual/image content. In some implementations, as illustrated in FIG. 3K, in response to determining that the merged piano guitar track 342 and the chicken marsala recipe 330 together do not satisfy the one or more compatibility criteria, the electronic device 310 displays, on the display 312, an incompatibility indicator 354.

In some implementations, the electronic device 310 displays an incompatibility indicator based on the merged piano guitar track 342 satisfying a proximity threshold with respect to the chicken marsala recipe 330, independent of detecting a particular gesture (e.g., the de-pinch gesture)

performed by the finger-wearable device 320. For example, the electronic device 310 displays an incompatibility indicator when the merged piano guitar track 342 moves less than a threshold distance from the chicken marsala recipe 330.

As illustrated in FIGS. 3L-3N, the electronic device 310 merges computer-generated objects based on determining that one or more compatibility criteria are satisfied. As illustrated in FIG. 3L, after selecting the wine pairings 335 (e.g., via a pinch gesture), the finger-wearable device 320 begins an upwards and leftwards movement of the wine pairings 335 towards the chicken marsala recipe 330. The upwards and leftwards movement is indicated by movement line 356 (illustrated for purely explanatory purposes). Before beginning the movement of the wine pairings 335, the wine pairings 335 is positioned at a fifth position within the environment, as indicated by a fifth position line 358 (illustrated for purely explanatory purposes). As further illustrated in FIG. 3L, a proximity threshold with respect to the chicken marsala recipe 330 is indicated by a proximity threshold line 360 (illustrated for purely explanatory purposes).

As illustrated in FIG. 3M, finger-wearable device 320 finishes the upwards and leftwards movement, and the electronic device 310 correspondingly moves the wine pairings 335 to a sixth position, as indicated by a sixth position line 362 (illustrated for purely explanatory purposes). Notably, the sixth position line 362 is closer to the chicken marsala recipe 330 than is the proximity threshold line 360. Accordingly, the electronic device 310 determines that the sixth position satisfies the proximity threshold with respect to the chicken marsala recipe 330.

As further illustrated in FIG. 3M, the finger-wearable device 320 performs a de-pinch gesture, as indicated by de-pinch line 364 (illustrated for purely explanatory purposes). In response to determining, based on finger manipulation data, that the finger-wearable device 320 performs the de-pinch gesture, the electronic device 310 determines that the chicken marsala recipe 330 and the wine pairings 335 together satisfy the one or more compatibility criteria. For example, the electronic device 310 identifies that each of the chicken marsala recipe 330 and the wine pairings 335 is respectively associated with textual content and/or image content. As another example, the electronic device 310 identifies that textual content associated with the wine pairings 335 includes a reference to the chicken marsala dish (e.g., which wine would pair well with chicken marsala). Accordingly, as illustrated in FIG. 3N, the electronic device 310 merges the chicken marsala recipe 330 with the wine pairings 335, and displays a merged chicken marsala recipe and wine pairings 365.

As illustrated in FIGS. 3O-3Q, the electronic device 310 merges a content item with a user interface element. Namely, the electronic device 310 merges the merged piano guitar track 342 (which is representative of audio content) with the EQ audio control interface 390. As illustrated in FIG. 3O, after selecting the merged piano guitar track 342 (e.g., via a pinch gesture), the finger-wearable device 320 begins a downwards and leftwards movement of the merged piano guitar track 342 towards the EQ audio control interface 390. The downwards and leftwards movement is indicated by movement line 366 (illustrated for purely explanatory purposes). Before beginning the movement of the merged piano guitar track 342, the merged piano guitar track 342 at positioned at a seventh position within the environment, as indicated by a seventh position line 368 (illustrated for purely explanatory purposes). As further illustrated in FIG. 3O, a proximity threshold with respect to the EQ audio control interface 390 is indicated by a proximity threshold line 370 (illustrated for purely explanatory purposes).

As illustrated in FIG. 3P, finger-wearable device 320 finishes the downwards and leftwards movement, and the electronic device 310 correspondingly moves the merged piano guitar track 342 to an eighth position, as indicated by an eighth position line 371 (illustrated for purely explanatory purposes). Notably, the eighth position line 371 is closer to the EQ audio control interface 390 than is the proximity threshold line 370. Accordingly, the electronic device 310 determines that the eighth position satisfies the proximity threshold with respect to the EQ audio control interface 390.

As further illustrated in FIG. 3P, the finger-wearable device 320 performs a de-pinch gesture, as indicated by de-pinch line 372 (illustrated for purely explanatory purposes). In response to determining, based on finger manipulation data, that the finger-wearable device 320 performs the de-pinch gesture, the electronic device 310 determines that the merged piano guitar track 342 and the EQ audio control interface 390 together satisfy one or more compatibility criteria. For example, the electronic device 310 identifies that the merged piano guitar track 342 is associated with audio content, and that the EQ audio control interface 390 includes one or more affordances (e.g., low, mid, and high) for manipulating audio content.

In response to determining that the merged piano guitar track 342 and the EQ audio control interface 390 together satisfy the one or more compatibility criteria, the electronic device 310 merges the merged piano guitar track 342 with the EQ audio control interface 390 in order to generate and display a populated EQ audio control interface 374, as illustrated in FIG. 3Q. In contrast to the two-dimensional (2D) EQ audio control interface 390, the populated EQ audio control interface 374 corresponds to a three-dimensional (3D) cube. As illustrated in FIG. 3Q, each side of the populated EQ audio control interface 374 cube corresponds to a different category affordance for audio editing. For example, a first side includes an EQ control affordance, a second side includes a guitar fader affordance that enables the user 50 to adjust the level (e.g., intensity) of the guitar track, and a third side includes a piano fader affordance that enables the user 50 to adjust the level (e.g., intensity) of the piano track.

As illustrated in FIG. 3R, the electronic device 310 detects, via an input device, an input 376 that rotates the populated EQ audio control interface 374 clockwise. In some implementations, the input device corresponds to the communication interface that obtains finger manipulation data from the finger-wearable device 320. In some implementations, the input device corresponds to one of an eye tracking system, computer-vision based extremity tracking system, stylus input system, touch input system, and/or the like.

In response to detecting the input 376 in FIG. 3R, the electronic device 310 rotates the populated EQ audio control interface 374 clockwise, as illustrated in FIG. 3S. Accordingly, the piano fader affordance moves from the side to the front of the populated EQ audio control interface 374. Additionally, a piano left/right (L/R) affordance becomes visible, wherein the piano L/R affordance enables the user 50 to adjust the left-right balance associated with the piano track.

As illustrated in FIGS. 3T and 3U, the electronic device 310 merges a first user interface element with a second user interface element. Namely, the electronic device 310 merges the populated EQ audio control interface 374 with the effects audio control interface 392. As illustrated in FIG. 3T, after selecting the populated EQ audio control interface 374 (e.g., via a pinch gesture), the finger-wearable device 320 begins a downwards and rightwards movement of the populated EQ audio control interface 374. The downwards and rightwards movement is indicated by movement line 378 (illustrated for purely explanatory purposes). The start and finish indicator lines and the proximity threshold indicator line are omitted for the sake of brevity, but notably the finger-wearable device 320 moves the populated EQ audio control interface 374 within a threshold distance from the effects audio control interface 392. Thus, the proximity threshold associated with the effects audio control interface 392 is satisfied.

In response to determining that the proximity threshold is satisfied, the electronic device 310 merges the populated EQ audio control interface 374 with the effects audio control interface 392 in order to generate a merged populated audio control interface 380, as illustrated in FIG. 3U. The merged populated audio control interface 380 includes the effects affordances (e.g., distortion, reverb, modulation) that were included in the effects audio control interface 392. In some implementations, merging the two user interface elements is in response to determining that the two user interface elements together satisfy one or more compatibility criteria. For example, the electronic device 310 determines that each of the populated EQ audio control interface 374 and the effects audio control interface 392 includes respective audio editing affordances.

Utilization of a particular control interface (e.g., the populated EQ audio control interface 374 or the effects audio control interface 392) may proceed according to various implementations. For example, in response to detecting an input directed to the distortion affordance within the effects audio control interface 392, the electronic device 310 accordingly changes a distortion level associated with a corresponding audio track.

As another example, in some implementations, in response to detecting an input directed to within a control interface, the electronic device 310 concurrently changes multiple audio characteristics. To that end, in some implementations, the electronic device 310 receives an input that is directed to within a merged computer-generated object, wherein the input selects at least a subset of the controls within the merged computer-generated object. For example, in response to detecting a swipe input directed to the fader affordance within the merged populated audio control interface 380, the electronic device 310 concurrently manipulates the fader affordance and the L/R affordance based on the swipe input. Moreover, the electronic device 310 modifies the audio track based on the manipulation of the fader affordance and the manipulation of the L/R affordance.

Figure 4:
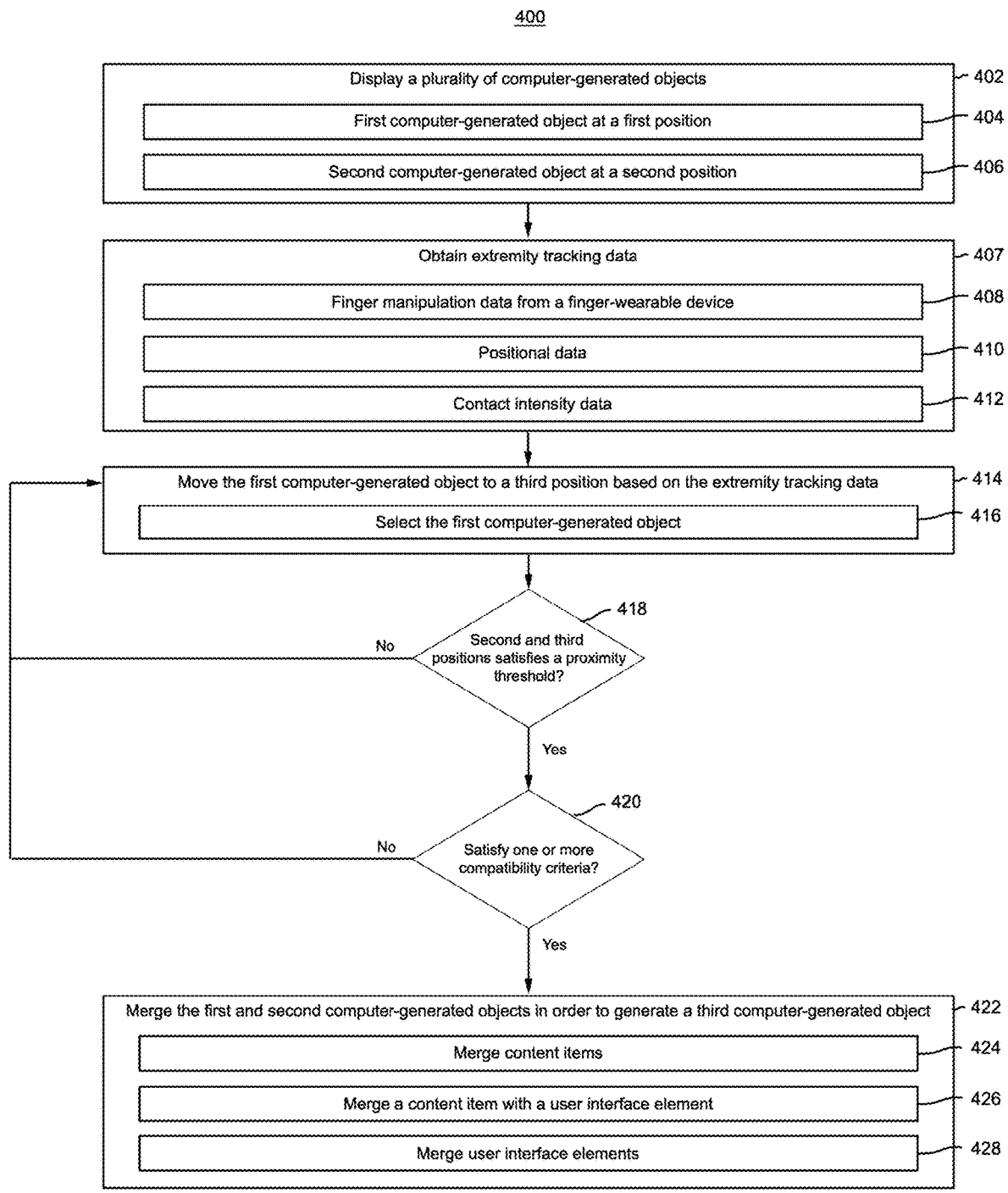
FIG. 4 is an example of a flow diagram of a method of merging computer-generated objects with each other in accordance with some implementations.

FIG. 4 is an example of a flow diagram of a method 400 of merging computer-generated objects with each other in accordance with some implementations. In various implementations, the method 400 or portions thereof are performed by an electronic device (e.g., the electronic device 100 in FIG. 1 or the electronic device 310 in FIGS. 3A-3U). In various implementations, the method 400 or portions thereof are performed by a head-mountable device (HMD). In some implementations, the method 400 is performed by processing logic, including hardware, firmware, software, or a combination thereof. In some implementations, the method 400 is performed by a processor executing code stored in a non-transitory computer-readable medium (e.g., a memory). In various implementations, some operations in method 400 are, optionally, combined and/or the order of some operations is, optionally, changed.

As represented by block 402, the method 400 includes displaying a plurality of computer-generated objects. In some implementations, the plurality of computer-generated objects includes a combination of two-dimensional (2D) and three-dimensional (3D) computer-generated objects. For example, with reference to FIG. 3H, the display 312 includes 2D computer-generated objects (e.g., the EQ audio control interface 390) and 3D computer-generated objects (e.g., the merged piano guitar track 342).

As represented by block 404, the plurality of computer-generated objects includes a first computer-generated object at a first position within an environment. The first computer-generated object corresponds to a first user interface element that includes a first set of controls for modifying a content item.

As represented by block 406, the plurality of computer-generated objects includes a second computer-generated object at a second position within the environment. For example, with reference to FIG. 3E, the piano track 334 is at a first position within the environment and the guitar track 332 is at a second position within the environment. In some implementations, the second computer-generated object corresponds to a second user interface element that includes a second set of controls for modifying a content item, environment. In some implementations, the second computer-generated object corresponds to the content item, which is modifiable by the first computer-generated object.

As represented by block 407, the method 400 includes obtaining extremity tracking data via an extremity tracker. For example, in some implementations, the extremity tracker includes a communication interface provided to communicate with a finger-wearable device. For example, in some implementations, the extremity tracker includes a computer-vision system that outputs the extremity tracking data.

As another example, in some implementations, the extremity tracking data correspond to finger manipulation data. To that end, as represented by block 408, while displaying the plurality of computer-generated objects, the method 400 includes obtaining the finger manipulation data from a finger-wearable device via a communication interface. For example, as described with reference to FIGS. 3A-3U, the electronic device 310 obtains various types of finger manipulation data from the finger-wearable device 320. The finger manipulation data may indicate positional information (e.g., six degrees of freedom) and contact intensity (e.g., pressure) information associated with the finger-wearable device. In some implementations, the finger manipulation data is indicative of a gesture performed by the finger-wearable device. According to various implementations, the finger manipulation data corresponds to sensor data associated with one or more sensors integrated within the finger-wearable device.

In some implementations, as represented by block 410, the sensor data includes positional data output from one or more positional sensors integrated in the finger-wearable device. As one example, the positional data is indicative of a rotational movement (e.g., 3D rotational data) and/or a translational movement (e.g., 3D positional data) of the finger-wearable device. In some implementations, an IMU (e.g., a gyroscope, accelerometer, etc.) that is integrated within the finger-wearable device outputs 3D rotational data. For example, the positional data is indicative of a rotation of the finger-wearable device, such as the pinch gesture and the de-pinch gesture respectively described with reference to FIGS. 3C-3D and FIGS. 3G-3H. In some implementations, a magnetic sensor that is integrated within the finger-wearable device outputs magnetic sensor data that includes 3D positional data. The magnetic sensor may sense weak magnetic fields in order to generate the magnetic sensor data. For example, the positional data is indicative of a movement of the finger-wearable device, such as the movements illustrated in FIGS. 3E-3G, FIGS. 3I-3J, FIGS. 3L-3M, FIGS. 3O-3P, and FIGS. 3T-3U. As another example, the positional data is indicative of a pinch gesture or a de-pinch gesture, respectively illustrated in FIGS. 3C-3D and FIGS. 3G-3H.

As another example, as represented by block 412, the sensor data includes contact intensity data output from a contact intensity sensor integrated in the finger-wearable device. As one example, the contact intensity data includes interferometer data that is indicative of tap pressure associated with a gesture that is performed by the finger-wearable device. The interferometer data may be from an interferometer that is integrated within the finger-wearable device. For example, the interferometer data indicates a pressure level associated with the finger-wearable device contacting a physical object, such as a tap gesture performed on the surface of the physical table 302.

As yet another example, in some implementations, the sensor data includes a combination of the positional data and the contact intensity data.

As represented by block 414, the method 400 includes moving the first computer-generated object from the first position to a third position within the environment based on the extremity tracking data. For example, the electronic device 310 moves the merged piano guitar track 342 from the seventh position indicated by the seventh positional line 368 in FIG. 3O to the eighth position indicated by the eighth positional line 371 in FIG. 3P, based on the finger manipulation data obtained from the finger-wearable device 320.

In some implementations, as represented by block 416, moving the first computer-generated object from the first position to the third position includes selecting (e.g., disambiguating) the first computer-generated object from the plurality of computer-generated objects based on the extremity tracking data. To that end, the method 400 includes determining that the extremity tracking data is indicative of a first gesture, wherein selecting the first computer-generated object is in response to determining that the extremity tracking data is indicative of the first gesture. For example, in some implementations, the first gesture corresponds to a pinch gesture. As one example, with reference to FIGS. 3C and 3D, the electronic device 310 obtains finger manipulation data indicative of the pinch gesture, as indicated by the pinch line 336, performed by the finger-wearable device 320, and accordingly selects the piano track 334. In some implementations, selecting the first computer-generated object includes determining that the first gesture satisfies a distance threshold with respect to the first computer-generated object, such as a pinch gesture terminating less than a threshold distance from the first computer-generated object. In some implementations, selecting the first computer-generated object is based on the first gesture, but is independent of a distance between the first gesture and the first computer-generated object. For example, while the finger-wearable device is performing the first gesture outside of the viewable region of the display (e.g., on the side of a couch), eye gaze data indicates that a user is focused on the first computer-generated object. In response to detecting the first gesture and that the user is focused on the first computer-generated object, the electronic device selects the first computer-generated object.

As represented by block 418, in response to moving the first computer-generated object to the third position, the method 400 includes determining whether the third position satisfies a proximity threshold with respect to the second position. In response to determining that the third position satisfies the proximity threshold, the method 400 proceeds to a portion of the method 400 represented by block 420 or to a portion of the method 400 represented by block 422. On the other hand, in response to determining that the third position does not satisfy the proximity threshold, the method 400 reverts to the portion of the method 400 represented by block 414.

As represented by block 420, in some implementations, the method 400 includes determining whether or not the first computer-generated object and the second computer-generated object together satisfy one or more compatibility criteria. In response to determining that the first computer-generated object and the second computer-generated object together satisfy the one or more compatibility criteria, the method 400 proceeds to a portion of the method 400 represented by block 422. On the other hand, in response to determining that the first computer-generated object and the second computer-generated object together do not satisfy the one or more compatibility criteria, the method 400 reverts to the portion of the method 400 represented by block 414.

For example, the one or more compatibility criteria includes a common content type criterion that is satisfied when the first and second computer-generated objects are associated with a common content type. The common content type may correspond to one of audio content, video content, textual content, image content, database content, and/or the like. For example, with reference to FIGS. 3G and 3H, the electronic device 310 determines that the piano track 334 and the guitar track 332 together satisfy the one or more compatibility criteria because the piano track 334 and the guitar track 332 are both associated with audio content. As a counterexample, with reference to FIGS. 3J and 3K, the electronic device 310 determines that the merged piano guitar track 342 and the chicken marsala recipe 330 together do not satisfy one or more compatibility criteria because the merged piano guitar track 342 is associated with audio content, whereas the chicken marsala recipe 330 is associated with textual/image content that is different from the audio content.

As represented by block 422, in accordance with a determination that the third position satisfies the proximity threshold, the method 400 includes merging the first computer-generated object with the second computer-generated object in order to generate a third computer-generated object, and displaying the third computer-generated object on the display. In some implementations, merging the first computer-generated object with the second computer-generated object includes ceasing to display the first computer-generated object and the second computer-generated object, such as ceasing to display the guitar track 332 and the piano track 334 in FIGS. 3G and 3H. In some implementations, merging the first computer-generated object with the second computer-generated object is further in response to determining that the extremity tracking data is indicative of a de-pinch gesture. For example, with reference to FIGS. 3G and 3H, the electronic device 310 determines, based on finger manipulation data, that the finger-wearable device 320 performs the de-pinch gesture, as indicated by a de-pinch line 341, and accordingly merges the guitar track 332 with the piano track 334.

In some implementations, merging the first computer-generated object with the second computer-generated object is further in response to determining that the first computer-generated object and the second computer-generated object together satisfy the one or more compatibility criteria. On the other hand, in some implementations, the method 400 includes, in response to determining that the first computer-generated object and the second computer-generated object together does not satisfy the one or more compatibility criteria, foregoing merging the first computer-generated object with the second computer-generated object, such as is described with reference to FIGS. 3J and 3K.

In some implementations, the third computer-generated object is based on the first and second computer-generated objects. As one example, with reference to FIGS. 3G and 3H, the merged piano guitar track 342 is a 3D cube that corresponds to a larger version of one of the 3D piano track 334 or the 3D guitar track 332. As another example, with reference to FIGS. 3P and 3Q, the populated EQ audio control interface 374 includes audio editing affordances based on the EQ audio control interface 390 and the merged piano guitar track 342. Namely, the populated EQ audio control interface 374 includes a guitar fader affordance and a piano fader affordance for respectively manipulating guitar audio content and piano audio content.

As represented by block 424, in some implementations, the first computer-generated object corresponds to a first content item, the second computer-generated object corresponds to a second content item, and the third computer-generated object corresponds to a third content item that is based on the first and second content items. For example, a particular content item is associated with one of audio content, video content, textual content, image content, database content, and/or the like. As one example, with reference to FIGS. 3L-3N, the electronic device 310 merges the wine pairings 335 (associated with textual/image content) with the chicken marsala recipe 330 (associated with textual/image content).

As represented by block 426, in some implementations, the first computer-generated object corresponds to a first content item, the second computer-generated object corresponds to a first user interface element, and the third computer-generated object corresponds to a second user interface element that is based on the first content item and the first user interface element. For example, a particular user interface element is provided to manipulate content items associated with the particular content type, such as audio editing, image editing, video editing, etc. As one example, with reference to FIGS. 3O-3Q, the electronic device 310 merges the merged piano guitar track 342 (associated with audio content) with the EQ audio control interface 390 in order to generate the populated EQ audio control interface 374. The populated EQ audio control interface 374 is based on the merged piano guitar track 342 and the EQ audio control interface 390, because the populated EQ audio control interface 374 is associated with guitar/piano audio content, and includes affordances for manipulating the guitar/piano audio content.

As represented by block 428, in some implementations, the first computer-generated object corresponds to a first user interface element, the second computer-generated object corresponds to a second user interface element, and the third computer-generated object corresponds to a third user interface element that is based on the first and second user interface elements. For example, the method 400 includes merging a 2D volume control interface (e.g., a first tile) with a 2D pitch control interface (e.g., a second tile) in order to generate two sides of a 3D audio editing interface (e.g., a cube). As one example, with references to FIGS. 3T and 3U, the electronic device 310 merges the populated EQ audio control interface 374 with the effects audio control interface 392 in order to generate the merged populated audio control interface 380. The merged populated audio control interface 380 includes the effects affordances (e.g., distortion, reverb, modulation) that were included in the effects audio control interface 392, and includes EQ affordances (e.g., low, mid, high) that were included in the populated EQ audio control interface 374.

In some implementations, the method 400 includes, in response to detecting an input, separating (e.g., de-merging) merged computer-generated objects. For example, in response to detecting a particular gesture type performed by a finger-wearable device (e.g., a double tap), the method 400 includes spatially separating two previously merged computer-generated objects. In some implementations, separating the merged computer-generated objects is in further response to determining that the particular gesture satisfies a particular proximity threshold with respect to the merged computer-generated objects. Accordingly, the method 400 enables the avoidance of accidental or unintended de-merging operations based on certain inputs from the finger-wearable device.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at an electronic device with one or more processors, a non-transitory memory, a display, and an extremity tracker:
displaying, on the display, a plurality of computer-generated objects within an extended reality (XR) environment, including a first computer-generated object at a first position within the XR environment, and a second computer-generated object at a second position within the XR environment, wherein the first computer-generated object corresponds to a first user interface element that includes a first set of controls for modifying a content item;
while displaying the plurality of computer-generated objects, obtaining extremity tracking data from the extremity tracker, wherein the extremity tracking data indicates a movement from the first position within the XR environment to a third position within the XR environment;
moving the first computer-generated object from the first position to the third position within the XR environment based on the extremity tracking data; and
in response to moving the first computer-generated object to the third position, in accordance with a determination that the third position satisfies a proximity threshold with respect to the second position:
merging the first computer-generated object with the second computer-generated object in order to generate a third computer-generated object for modifying the content item; and
displaying, on the display, the third computer-generated object within the XR environment.

2. The method of claim 1, wherein the extremity tracker includes a communication interface provided to communicate with a finger-wearable device, and wherein the extremity tracking data includes finger manipulation data from the finger-wearable device via the communication interface.

3. The method of claim 2, wherein the finger manipulation data corresponds to sensor data associated with one or more sensors integrated within the finger-wearable device.

4. The method of claim 3, wherein the sensor data includes positional data output from one or more positional sensors integrated in the finger-wearable device.

5. The method of claim 2, wherein the extremity tracker further includes a computer vision system, and wherein the computer vision system generates a respective portion of the extremity tracking data by tracking an extremity within image data.

6. The method of claim 3, wherein the sensor data includes contact intensity data output from a contact intensity sensor integrated in the finger-wearable device.

7. The method of claim 1, wherein moving the first computer-generated object from the first position to the third position includes selecting the first computer-generated object from the plurality of computer-generated objects based on the extremity tracking data.

8. The method of claim 7, further comprising determining that the extremity tracking data is indicative of a first gesture, wherein selecting the first computer-generated object is in response to determining that the extremity tracking data is indicative of the first gesture.

9. The method of claim 8, wherein the first gesture corresponds to a pinch gesture.

10. The method of claim 1, wherein merging the first computer-generated object with the second computer-generated object is further in response to determining that the extremity tracking data is indicative of a de-pinch gesture.

11. The method of claim 1, wherein the plurality of computer-generated objects includes a combination of two-dimensional (2D) and three-dimensional (3D) computer-generated objects.

12. The method of claim 1, wherein merging the first computer-generated object with the second computer-generated object includes ceasing to display the first computer-generated object and the second computer-generated object.

13. The method of claim 1, further comprising:
determining whether or not the first computer-generated object and the second computer-generated object together satisfy one or more compatibility criteria, wherein merging the first computer-generated object with the second computer-generated object is further in response to determining that the first computer-generated object and the second computer-generated object together satisfy the one or more compatibility criteria; and in response to determining that the first computer-generated object and the second computer-generated object together do not satisfy the one or more compatibility criteria, foregoing merging the first computer-generated object with the second computer-generated object.

14. The method of claim 13, wherein the one or more compatibility criteria includes a common content type criterion that is satisfied when the first and second computer-generated objects are associated with a common content type.

15. The method of claim 1, wherein the second computer-generated object corresponds to a second user interface element that includes a second set of controls for modifying the content item, and wherein the third computer-generated object includes a portion of the first set of controls and a portion of the second set of controls.

16. The method of claim 15, further comprising:
receiving an input that is directed to within the third computer-generated object, wherein the input selects the portion of the first set of controls within the third computer-generated object; and
in response to receiving the input:
manipulating the portion of the first set of controls based on the input;
manipulating the portion of the second set of controls based on the input; and
modifying the content item according to the manipulations.

17. The method of claim 1, wherein the second computer-generated object corresponds to the content item.

18. The method of claim 1, wherein the electronic device corresponds to a head-mountable device (HMD).

19. An electronic device comprising:
one or more processors;
a non-transitory memory;
a display;
an extremity tracker; and
one or more programs, wherein the one or more programs are stored in the non-transitory memory and configured to be executed by the one or more processors, the one or more programs including instructions for:
displaying, on the display, a plurality of computer-generated objects, including a first computer-generated object at a first position within an XR environment, and a second computer-generated object at a second position within the XR environment, wherein the first computer-generated object corresponds to a first user interface element that includes a first set of controls for modifying a content item;
while displaying the plurality of computer-generated objects, obtaining extremity tracking data from the extremity tracker, wherein the extremity tracking data indicates a movement from the first position within the XR environment to a third position within the XR environment;
moving the first computer-generated object from the first position to the third position within the XR environment based on the extremity tracking data; and
in response to moving the first computer-generated object to the third position, in accordance with a determination that the third position satisfies a proximity threshold with respect to the second position:
merging the first computer-generated object with the second computer-generated object in order to generate a third computer-generated object for modifying the content item; and
displaying, on the display, the third computer-generated object within the XR environment.

20. A non-transitory computer readable storage medium storing one or more programs, the one or more programs comprising instructions, which, when executed by an electronic device with one or more processors, a display, and an extremity tracker, cause the electronic device to:
display, on the display, a plurality of computer-generated objects, including a first computer-generated object at a first position within an XR environment, and a second computer-generated object at a second position within the XR environment, wherein the first computer-generated object corresponds to a first user interface element that includes a first set of controls for modifying a content item;
while displaying the plurality of computer-generated objects, obtain extremity tracking data from the extremity tracker, wherein the extremity tracking data indicates a movement from the first position within the XR environment to a third position within the XR environment;
move the first computer-generated object from the first position to the third position within the XR environment based on the extremity tracking data; and
in response to moving the first computer-generated object to the third position, in accordance with a determination that the third position satisfies a proximity threshold with respect to the second position:
merge the first computer-generated object with the second computer-generated object in order to generate a third computer-generated object for modifying the content item; and
display, on the display, the third computer-generated object within the XR environment.

* * * * *